(12) United States Patent
Sakamaki et al.

(10) Patent No.: US 10,576,673 B2
(45) Date of Patent: Mar. 3, 2020

(54) RESIN GEAR, INJECTION MOLDING METHOD FOR RESIN GEAR, RESIN-TOOTH-PROVIDED BELT PULLEY, AND RESIN ROTATOR

(71) Applicant: ENPLAS CORPORATION, Saitama (JP)

(72) Inventors: Kazuyuki Sakamaki, Saitama (JP); Tetsuya Tokiwa, Saitama (JP)

(73) Assignee: ENPLAS CORPORATION, Saitama (JP)

( * ) Notice: Subject to any disclaimer, the term of this patent is extended or adjusted under 35 U.S.C. 154(b) by 0 days.

(21) Appl. No.: 16/086,527

(22) PCT Filed: Feb. 22, 2017

(86) PCT No.: PCT/JP2017/006517
§ 371 (c)(1),
(2) Date: Sep. 19, 2018

(87) PCT Pub. No.: WO2017/163731
PCT Pub. Date: Sep. 28, 2017

(65) Prior Publication Data
US 2019/0099931 A1 Apr. 4, 2019

(30) Foreign Application Priority Data

Mar. 23, 2016 (JP) .................................. 2016-058726

(51) Int. Cl.
*B29C 45/27* (2006.01)
*F16H 55/06* (2006.01)
(Continued)

(52) U.S. Cl.
CPC .......... *B29C 45/2708* (2013.01); *B29C 45/27* (2013.01); *B29D 15/00* (2013.01);
(Continued)

(58) Field of Classification Search
CPC ................ B29C 45/2708; B29C 45/27; B29C 2045/2709; B29D 15/00; F16H 55/06; F16H 55/17; F16H 2055/065; B26C 2045/2716; B29L 2015/00; B29L 2015/003
See application file for complete search history.

(56) References Cited

U.S. PATENT DOCUMENTS

2002/0029648 A1* 3/2002 Noguchi ................. F16H 55/17
74/461
2002/0139211 A1 10/2002 Ishizuka et al.
(Continued)

FOREIGN PATENT DOCUMENTS

| JP | 58-26524 | 2/1983 |
| JP | 2002-295643 | 10/2002 |
| JP | 3387218 | 3/2003 |

OTHER PUBLICATIONS

International Search Report dated May 30, 2017 in International (PCT) Application No. PCT/JP2017/006517.

*Primary Examiner* — Zakaria Elahmadi
(74) *Attorney, Agent, or Firm* — Wenderoth, Lind & Ponack, L.L.P.

(57) ABSTRACT

A resin gear includes a web with a side surface on which a first annular rib and a second annular rib are formed to be concentric with a boss. The web has an inner web portion coupling the first annular rib to the second annular rib, and an outer web portion coupling the second annular rib to a rim. The inner web portion is formed to have a thickness gradually reduced from one intersection point toward another intersection point, the intersection points being intersection points of a virtual radial direction line passing through a center of the boss with the second annular rib. The first annular rib has a side surface on which only one gate mark of an injection molding is formed at a position on a radially outer side with respect to a first tooth portion and a position biased to the other intersection point on the virtual radial direction line.

15 Claims, 12 Drawing Sheets

(51) Int. Cl.
*B29D 15/00* (2006.01)
*F16H 55/48* (2006.01)
*F16H 55/17* (2006.01)
*B29L 15/00* (2006.01)

(52) U.S. Cl.
CPC .............. *F16H 55/06* (2013.01); *F16H 55/17* (2013.01); *F16H 55/48* (2013.01); *B29C 2045/2709* (2013.01); *B29C 2045/2716* (2013.01); *B29L 2015/00* (2013.01); *B29L 2015/003* (2013.01); *F16H 2055/065* (2013.01)

(56) References Cited

U.S. PATENT DOCUMENTS

| | | | | |
|---|---|---|---|---|
| 2006/0053918 | A1* | 3/2006 | Asari | F16H 55/06 74/423 |
| 2008/0066570 | A1* | 3/2008 | Kashimura | B29C 33/005 74/439 |
| 2008/0276741 | A1* | 11/2008 | Miura | F16H 55/06 74/457 |
| 2009/0007711 | A1* | 1/2009 | Suzuki | B29C 45/0025 74/457 |
| 2013/0220048 | A1* | 8/2013 | Iijima | B29C 45/0025 74/434 |
| 2013/0228028 | A1* | 9/2013 | Kim | B62D 5/0409 74/434 |
| 2015/0007680 | A1* | 1/2015 | Hashimoto | F16H 55/06 74/434 |
| 2015/0174804 | A1* | 6/2015 | Motoda | F16H 55/06 74/434 |
| 2015/0308555 | A1* | 10/2015 | Oberle | F16H 55/06 74/421 R |
| 2016/0033026 | A1* | 2/2016 | Tsukahara | F16H 55/17 74/434 |
| 2017/0095950 | A1* | 4/2017 | Brochot | B29C 45/1615 |
| 2018/0017149 | A1* | 1/2018 | Takeuchi | B62D 5/0454 |

* cited by examiner

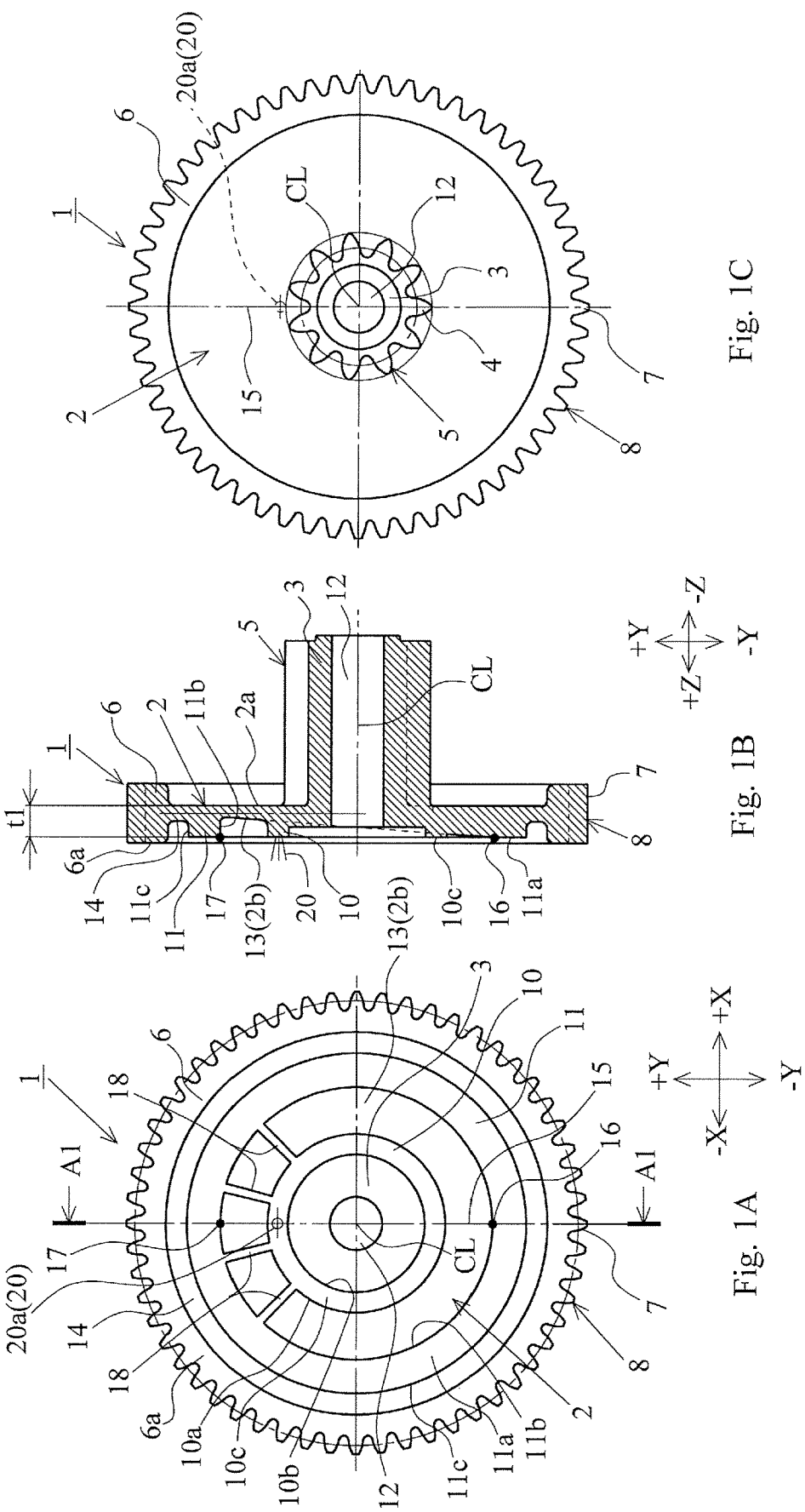

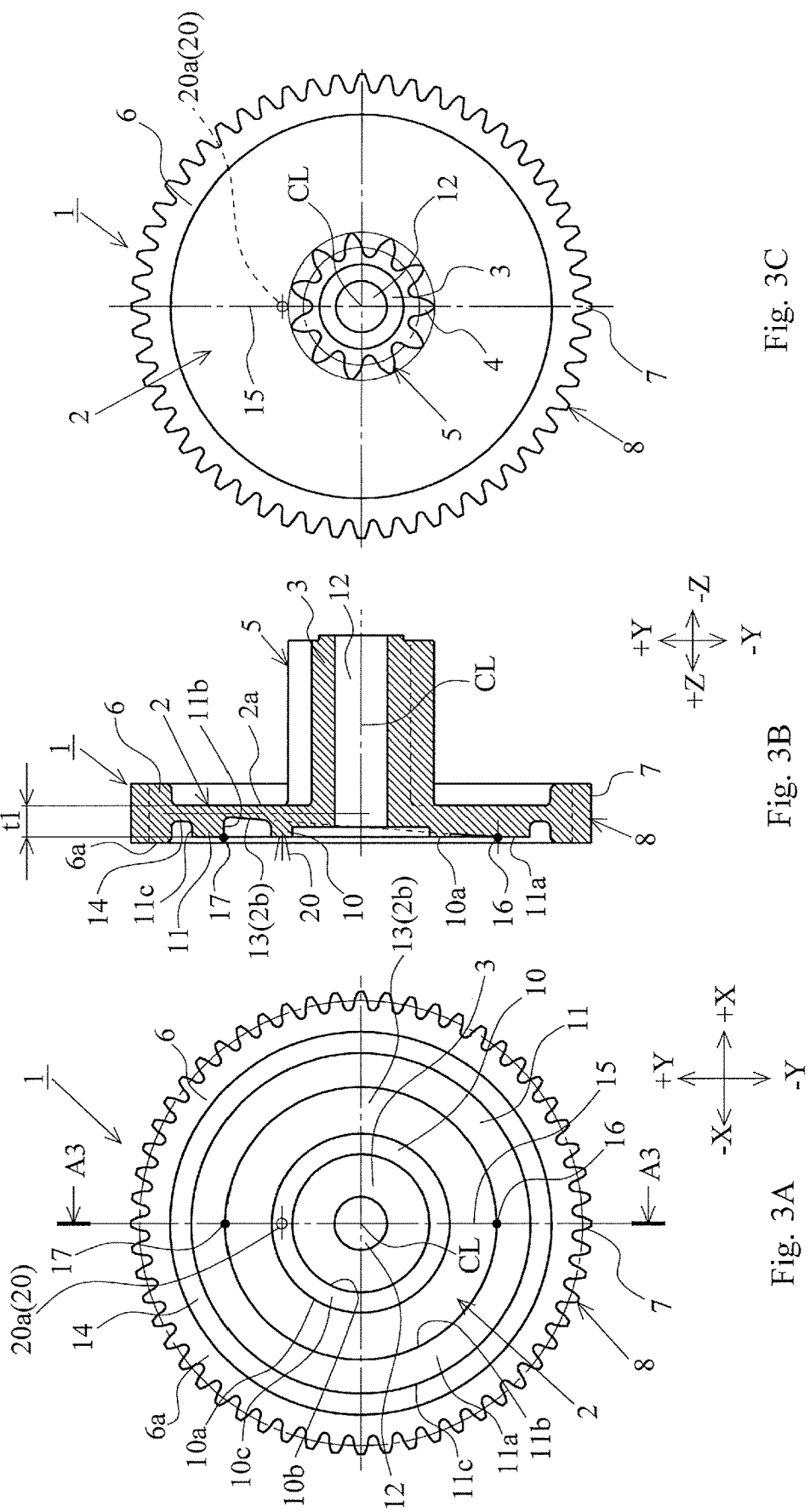

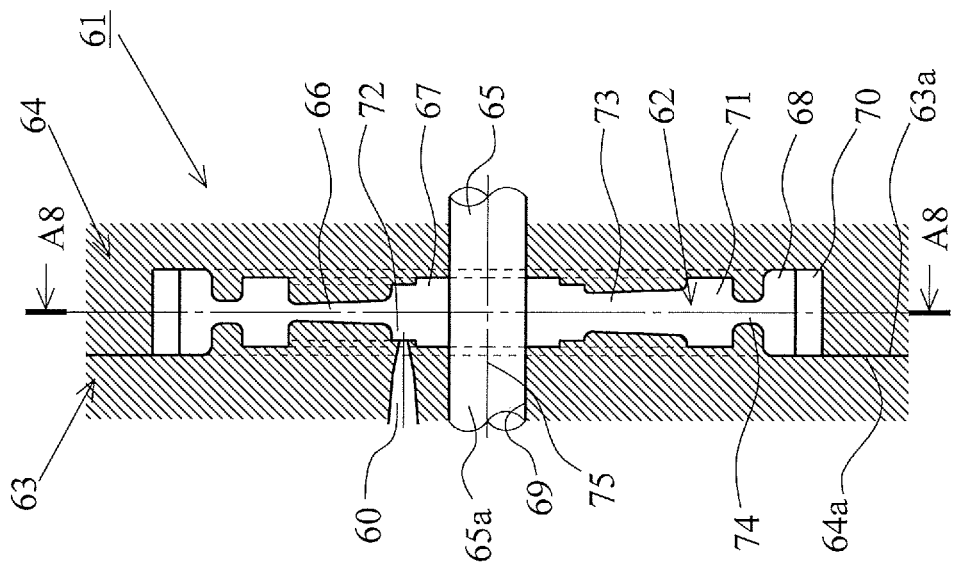
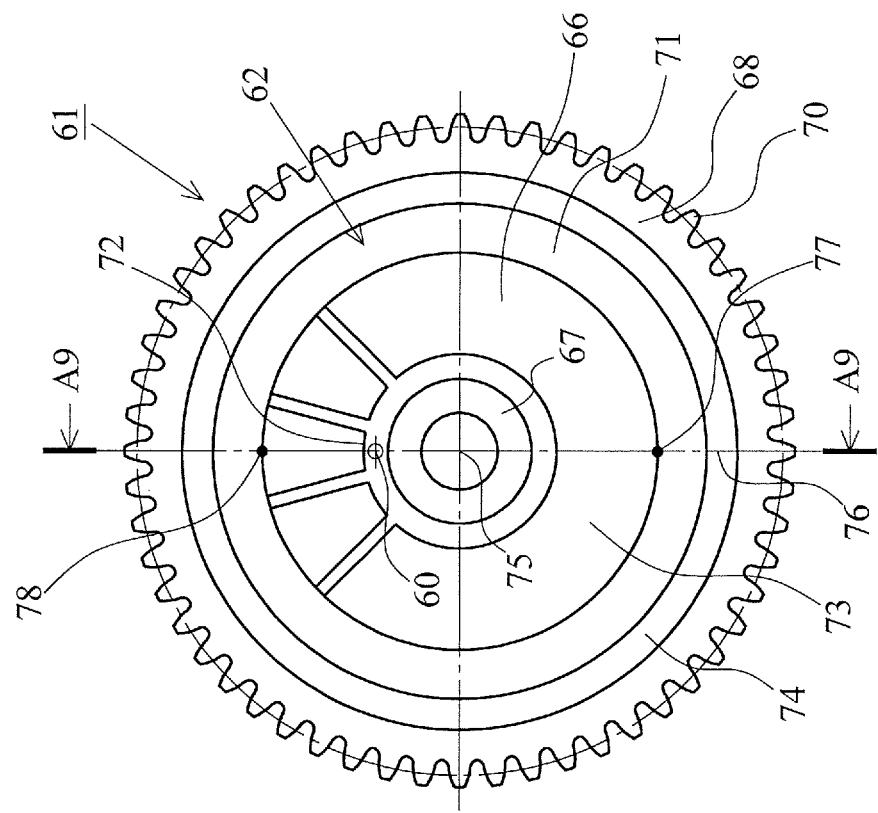

RESIN GEAR, INJECTION MOLDING METHOD FOR RESIN GEAR, RESIN-TOOTH-PROVIDED BELT PULLEY, AND RESIN ROTATOR

TECHNICAL FIELD

This invention relates to a resin gear used for transmitting a rotation, an injection molding method for the resin gear, a resin-tooth-provided belt pulley, and a resin rotator.

BACKGROUND ART

Conventionally, a resin gear fabricated by an injection molding has been devised to control a flow of a molten resin material inside a cavity such that a molten resin is simultaneously filled into a cavity portion forming a tooth portion, thus improving a shape accuracy such as a roundness influencing on a rotation transmission accuracy.

For example, a conventional resin gear 100 illustrated in FIG. 12 is configured such that a web 103 couples a boss 101 to a tooth portion 102, first to third annular ribs 104 to 106 concentric with the boss 101 are formed on the web 103 with intervals from a radially inner side, and five gates 107 are opened at regular intervals in a circumferential direction of the second annular rib 105. This conventional resin gear 100 includes radial direction ribs 108 that couple the first to third annular ribs 104 to 106 in the radial direction, and the radial direction ribs 108 are formed at intermediate positions of adjacent gate marks 107a (the gates 107) and on both front and back surfaces of the web 103. On this conventional resin gear 100, a thickness of an inner web portion 110 between the first annular rib 104 and the second annular rib 105 and a thickness of an outer web portion 111 between the second annular rib 105 and the third annular rib 106 are thinnest on radial direction lines 112 passing through the gate marks 107a, and the thicknesses increase as separating from the radial direction lines 112 passing through the gate marks 107a along the circumferential direction.

A description will be given of such flow of the molten resin in an injection molding of the resin gear 100 with reference to FIG. 12A. Most of the molten resin injected into the cavity portion forming the second annular rib 105 from the five gates 107 flows along the circumferential direction of the cavity portion forming the second annular rib 105 because the thicknesses of the inner web portion 110 and the outer web portion 111 are thinner than the thickness of a portion where the second annular rib 105 is formed (the second annular rib 105 and the web 103 on which this second annular rib 105 is formed). This flow of the molten resin along the circumferential direction of the cavity portion forming the second annular rib 105 flows also in the radial direction in the flow process. However, since the thicknesses of the inner web portion 110 and the outer web portion 111 are thinnest on the radial direction lines 112 passing through the gate marks 107a, and the thicknesses of the inner web portion 110 and the outer web portion 111 increase as separating from the radial direction lines 112 passing through the gate marks 107a along the circumferential direction, the flows near the gate marks 107a in the radial direction are suppressed while the flows at the intermediate positions of the adjacent gate marks 107a and 107a in the radial direction are accelerated, thus uniformizing the amount of the flows in the radial direction. The flow of the molten resin along the circumferential direction of the cavity portion forming the second annular rib 105 joins the molten resin flowing from the other adjacent gate 107, and flows in the cavity portion forming the radial direction rib 108 in the radial direction. Thus, the molten resin flowing in the cavity portion forming the inner web portion 110, the cavity portion forming the outer web portion 111, and the cavity portion forming the radial direction rib 108 in the radial direction flows into the cavity portion forming the first annular rib 104 and the cavity portion forming the third annular rib 106, and is accumulated in the cavity portion forming the first annular rib 104 and the cavity portion forming the third annular rib 106. This equalizes the strength of the flow from the cavity portion forming the first annular rib 104 toward the cavity portion forming the boss 101 in the radial direction, and equalizes the strength of the flow from the cavity portion forming the third annular rib 106 toward the cavity portion forming the tooth portion 102 in the radial direction. Consequently, the resin gear 100 illustrated in FIG. 12 has achieved the improvement of the shape accuracy such as the roundness of the tooth portion (the outer tooth portion) 102 and the boss (the inner tooth portion) 101 (see Patent Document 1).

Patent Document 1: Japanese Patent No. 3387218

DISCLOSURE OF THE INVENTION

Problems to be Solved by the Invention

However, the conventional resin gear 100 illustrated in FIG. 12 is configured such that in the injection molding, the molten resin is injected into the cavities from the five gates 107. Then, there has been a problem that a large amount of the molten resin remaining in a runner of an injection molding mold coupled to the gates 107 causes a poor usage efficiency of the resin material.

Therefore, the applicant of this application provides a resin gear having excellent shape accuracy such as a roundness even in an injection molding with one gate so as to improve the usage efficiency of a resin material, an injection molding method for the resin gear, a resin-tooth-provided belt pulley, and a resin rotator.

Solutions to the Problems

As illustrated in FIG. 1, a resin gear 1 according to the present invention includes a circular plate-shaped web 2, a cylindrically-shaped boss 3, a first tooth portion 5, a cylindrically-shaped rim 6, and a second tooth portion 8. The boss 3 is formed at a radially inward end of the web 2. The first tooth portion 5 is formed on one side surface 2a side of the web 2 and an outer peripheral surface of the boss 3. The first tooth portion 5 includes a plurality of teeth 4. The rim 6 is positioned at a radially outward end of the web 2 and concentric with the boss 3. The second tooth portion 8 is formed on an outer peripheral surface of the rim 6. The second tooth portion 8 includes a plurality of teeth 7. In the present invention, a first annular rib 10 is formed on another side surface 2b of the web 2 and in proximity to the boss 3. The first annular rib 10 is concentric with the boss 3. A second annular rib 11 is formed on the other side surface 2b of the web 2 and between the first annular rib 10 and the rim 6. The second annular rib 11 is concentric with the rim 6. The web 2 has an inner web portion 13 and an outer web portion 14. The inner web portion 13 couples the first annular rib 10 to the second annular rib 11. The outer web portion 14 couples the second annular rib 11 to the rim 6. The inner web portion 13 is formed to have a thickness gradually reduced from one intersection point 16 toward another intersection point 17 among a pair of intersection points 16 and 17 of a virtual radial direction line 15 with the second annular rib 11. The virtual radial direction line 15 passes through a center (CL) of the boss 3 and extends in a radial direction. The inner web portion 13 has a thickness on the other intersection point 17 side thinner than a thickness of a portion on which the second annular rib 11 is formed. The outer web portion 14 is formed to be thinner than the thickness of the portion on which the second annular rib 11 is formed. The first annular rib 10 has a side surface 10c on which only one gate mark 20a of an injection molding is formed at a position on a radially outer side with respect to the first tooth portion 5 and a position biased to the other intersection point 17 on the virtual radial direction line 15.

As illustrated in FIG. 5, a resin gear 41 according to the present invention includes a circular plate-shaped web 42, a cylindrically-shaped boss 43, a cylindrically-shaped rim 44, and a tooth portion 46. The boss 43 is formed at a radially inward end of the web 42. The rim 44 is positioned at a radially outward end of the web 42 and concentric with the boss 43. The tooth portion 46 is formed on an outer peripheral surface of the rim 44. The tooth portion 46 includes a plurality of teeth 45. In the present invention, an annular rib 47 is formed on both side surfaces 42a and 42b of the web 42 and at a position biased to the rim 44 with respect to the boss 43. The annular rib 47 is concentric with the rim 44. The web 42 has an inner web portion 52 and an outer web portion 53. The inner web portion 52 couples the boss 43 to the annular rib 47. The outer web portion 53 couples the annular rib 47 to the rim 44. The inner web portion 52 is formed to have a thickness gradually reduced from one intersection point 55 toward another intersection point 56 among a pair of intersection points 55 and 56 of a virtual radial direction line 54 with the annular rib 47. The virtual radial direction line 54 passes through a center (CL) of the boss 43 and extends in a radial direction. The inner web portion 52 is formed to have a thickness on the other intersection point 56 side thinner than a thickness of a portion on which the annular rib 47 is formed. The outer web portion 53 is formed to be thinner than the thickness of the portion on which the annular rib 47 is formed. Respective annular gate-receiving protrusions 50 concentric with the boss are formed at corner portions of both side surfaces 42a and 42b of the web 42 and an outer peripheral surface 43a of the boss 43, and the gate-receiving protrusions 50 are formed across the web 42 and the boss 43. One of the gate-receiving protrusions 50 and 50 on both side surfaces 42a and 42b of the web 42 has only one gate mark 58 of an injection molding at a position biased to the other intersection point 56 on the virtual radial direction line 54.

As illustrated in FIG. 10, a resin gear 1 according to the present invention includes a circular plate-shaped web 2, a cylindrically-shaped boss 3, a first tooth portion 5, a cylindrically-shaped rim 6, and a second tooth portion 8. The boss 3 is formed at a radially inward end of the web 2. The first tooth portion 5 is formed on one side surface 2a side of the web 2 and an outer peripheral surface of the boss 3. The first tooth portion 5 includes a plurality of teeth 4. The rim 6 is positioned at a radially outward end of the web 2 and concentric with the boss 3. The second tooth portion 8 is formed on an outer peripheral surface of the rim 6. The second tooth portion 8 includes a plurality of teeth 7. In the present invention, an annular rib 11 is formed on another side surface 2b of the web 2 and between the boss 3 and the rim 6. The annular rib 11 is concentric with the rim 6. The web 2 has an inner web portion 13 and an outer web portion 14. The inner web portion 13 is positioned inside the annular rib 11. The outer web portion 14 couples the annular rib 11 to the rim 6. The inner web portion 13 is formed to have a thickness gradually reduced from one intersection point 16 toward another intersection point 17 among a pair of intersection points 16 and 17 of a virtual radial direction line 15 with the annular rib 11. The virtual radial direction line 15 passes through a center (CL) of the boss 3 and extends in a radial direction. The inner web portion 13 has a thickness on the other intersection point 17 side thinner than a thickness of a portion on which the annular rib 11 is formed. The outer web portion 14 is formed to be thinner than the thickness of the portion on which the annular rib 11 is formed. The inner web portion 13 has the other side surface 2b on which only one gate mark 20a of an injection molding is formed at a position on a radially outer side with respect to the first tooth portion 5 and a position biased to the other intersection point 17 on the virtual radial direction line 15.

As illustrated in FIG. 11, a resin gear 41 according to the present invention includes a circular plate-shaped web 42, a cylindrically-shaped boss 43, a cylindrically-shaped rim 44, and a tooth portion 46. The boss 43 is formed at a radially inward end of the web 42. The rim 44 is positioned at a radially outward end of the web 42 and concentric with the boss 43. The tooth portion 46 is formed on an outer peripheral surface of the rim 44. The tooth portion 46 includes a plurality of teeth 45. In the present invention, an annular rib 47 is formed on both side surfaces 42a and 42b of the web 42 and at a position biased to the rim 44 with respect to the boss 43. The annular rib 47 is concentric with the rim 44. The web 42 has an inner web portion 52 and an outer web portion 53. The inner web portion 52 couples the boss 43 to the annular rib 47. The outer web portion 53 couples the annular rib 47 to the rim 44. The inner web portion 52 is formed to have a thickness gradually reduced from one intersection point 55 toward another intersection point 56 among a pair of intersection points 55 and 56 of a virtual radial direction line 54 with the annular rib 47. The virtual radial direction line 54 passes through a center (CL) of the boss 43 and extends in a radial direction. The inner web portion 52 is formed to have a thickness on the other intersection point 56 side thinner than a thickness of a portion on which the annular rib 47 is formed. The outer web portion 53 is formed to be thinner than the thickness of the portion on which the annular rib 47 is formed. Only one gate mark 58 of an injection molding is formed at a position biased to the boss 43 on the one side surface 52a of the web 42 (the inner web portion 52) and a position biased to the other intersection point 56 on the virtual radial direction line 54.

As illustrated in FIG. 8, a resin-tooth-provided belt pulley 80 according to the present invention includes a circular plate-shaped web 42, a cylindrically-shaped boss 43, a cylindrically-shaped rim 44, and a tooth portion 81. The boss 43 is formed at a radially inward end of the web 42. The rim 44 is positioned at a radially outward end of the web 42 and concentric with the boss 43. The tooth portion 81 is formed on an outer peripheral surface of the rim 44. The tooth portion 81 includes a plurality of teeth 81a. In the present invention, an annular rib 47 is formed on both side surfaces 42a and 42b of the web 42 and at a position biased to the rim 44 with respect to the boss 43. The annular rib 47 is concentric with the rim 44. The web 42 has an inner web portion 52 and an outer web portion 53. The inner web portion 52 couples the boss 43 to the annular rib 47. The outer web portion 53 couples the annular rib 47 to the rim 44. The inner web portion 52 is formed to have a thickness gradually reduced from one intersection point 55 toward another intersection point 56 among a pair of intersection points 55 and 56 of a virtual radial direction line 54 with the annular rib 47. The virtual radial direction line 54 passes through a center (CL) of the boss 43 and extends in a radial direction. The inner web portion 52 is formed to have a thickness on the other intersection point 56 side thinner than a thickness of a portion on which the annular rib 47 is formed. The outer web portion 53 is formed to be thinner than the thickness of the portion on which the annular rib 47 is formed. Annular gate-receiving protrusions 50 concentric with the boss 43 are formed at corner portions of both side surfaces 42a and 42b of the web 42 and an outer peripheral surface 43a of the boss 43, and the gate-receiving protrusions 50 are formed across the web 42 and the boss 43. One of the gate-receiving protrusions 50 and 50 on both side surfaces 42a and 42b of the web 42 has only one gate mark 58 of an injection molding at a position biased to the other intersection point 56 on the virtual radial direction line 54.

As illustrated in FIG. 9, a resin rotator 82 according to the present invention includes a circular plate-shaped web 42, a cylindrically-shaped boss 43, and a cylindrically-shaped outer peripheral side tubular portion 83. The boss 43 is formed at a radially inward end of the web 42. The outer peripheral side tubular portion 83 is positioned at a radially outward end of the web 42 and concentric with the boss 43. In the present invention, an annular rib 47 is formed on both side surfaces 42a and 42b of the web 42 and at a position biased to the outer peripheral side tubular portion 83 with respect to the boss 43. The annular rib 47 is concentric with the outer peripheral side tubular portion 83. The web 42 has an inner web portion 52 and an outer web portion 53. The inner web portion 52 couples the boss 43 to the annular rib 47. The outer web portion 53 couples the annular rib 47 to the outer peripheral side tubular portion 83. The inner web portion 52 is formed to have a thickness gradually reduced from one intersection point 55 toward another intersection point 56 among a pair of intersection points 55 and 56 of a virtual radial direction line 54 with the annular rib 47. The virtual radial direction line 54 passes through a center (CL) of the boss 43 and extends in a radial direction. The inner web portion 52 is formed to have a thickness on the other intersection point 56 side thinner than a thickness of a portion on which the annular rib 47 is formed. The outer web portion 53 is formed to be thinner than the thickness of the portion on which the annular rib 47 is formed. Annular gate-receiving protrusions 50 concentric with the boss 43 are formed at corner portions of both side surfaces 42a and 42b of the web 42 and an outer peripheral surface 43a of the boss 43, and the gate-receiving protrusions 50 are formed across the web 42 and the boss 43. One of the gate-receiving protrusions 50 and 50 on both side surfaces 42a and 42b of the web 42 has only one gate mark 58 of an injection molding at a position biased to the other intersection point 56 on the virtual radial direction line 54.

Effects of the Invention

The resin gear, the resin-tooth-provided belt pulley, or the resin rotator according to the present invention has the excellent shape accuracy such as the roundness even in the injection molding with one gate so as to improve the usage efficiency of the resin material.

BRIEF DESCRIPTION OF THE DRAWINGS

FIGS. 1A-1C include drawings illustrating a resin gear according to a first embodiment of the present invention, FIG. 1A is a front view of the resin gear, FIG. 1B is a cross-sectional view of the resin gear taken along a line A1-A1 in FIG. 1A, and FIG. 1C is a back view of the resin gear.

FIG. 2A is a front view of the inner web portion, FIG. 2B is a side view of the inner web portion, and FIG. 2C is a cross-sectional view of the inner web portion taken along a line A2-A2 in FIG. 2A.

FIGS. 3A-3C include drawings illustrating a resin gear according to a modification of the first embodiment, FIG. 3A is a front view of the resin gear, FIG. 3B is a cross-sectional view of the resin gear taken along a line A3-A3 in FIG. 3A, and FIG. 3C is a back view of the resin gear.

FIG. 4A is a plan view of a cavity illustrating by taking a mold (a mold on which a mold clamping has been performed) for an injection molding along a line A4-A4 in FIG. 4B, and FIG. 4B is a cross-sectional view of the mold for the injection molding taken along a line A5-A5 in FIG. 4A.

FIG. 5A is a front view of the resin gear, FIG. 5B is a cross-sectional view of the resin gear taken along a line A6-A6 in FIG. 5A, and FIG. 5C is a back view of the resin gear.

FIG. 6A is a front view of the resin gear, FIG. 6B is a cross-sectional view of the resin gear taken along a line A7-A7 in FIG. 6A, and FIG. 6C is a back view of the resin gear.

FIGS. 7A and 7B include drawings describing an injection molding method for the resin gear according to the second embodiment of the present invention, FIG. 7A is a plan view of a cavity illustrating by taking a mold (a mold on which a mold clamping has been performed) for an injection molding along a line A8-A8 in FIG. 7B, and FIG. 7B is a cross-sectional view of the mold for the injection molding taken along a line A9-A9 in FIG. 7A.

FIG. 8A is a front view of the resin-tooth-provided belt pulley, FIG. 8B is a cross-sectional view of the resin-tooth-provided belt pulley taken along a line A10-A10 in FIG. 8A, and FIG. 8C is a back view of the resin-tooth-provided belt pulley.

FIGS. 9A-9D include drawings illustrating a resin rotator according to a fourth embodiment of the present invention, FIG. 9A is a front view of the resin rotator, FIG. 9B is a cross-sectional view of the resin rotator taken along a line A11-A11 in FIG. 9A, FIG. 9C is a back view of the resin rotator, and FIG. 9D is a partial cross-sectional view of the resin rotator illustrating an application example to a resin V-belt pulley.

FIG. 10A is a front view of the resin gear, FIG. 10B is a cross-sectional view of the resin gear taken along a line A12-A12 in FIG. 10A, and FIG. 10C is a back view of the resin gear.

FIG. 11A is a front view of the resin gear, FIG. 11B is a cross-sectional view of the resin gear taken along a line A13-A13 in FIG. 11A, and FIG. 11C is a back view of the resin gear.

FIG. 12A is a front view of the conventional resin gear, FIG. 12B is a cross-sectional view of the conventional resin gear taken along a line A14-A14 in FIG. 12A, and FIG. 12C is a partial cross-sectional view of the conventional resin gear taken along a line A15-A15 in FIG. 12A.

DESCRIPTION OF PREFERRED EMBODIMENTS

Figure 2C:
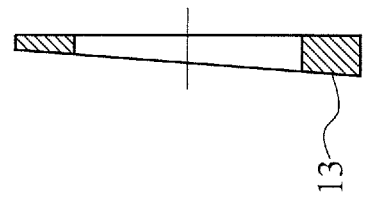
FIGS. 2A-2C include drawings illustrating an inner web portion extracted from the resin gear according to the first embodiment.

The following describes embodiments of the present invention based on the drawings.

[First Embodiment]

FIG. 1 includes drawings illustrating a resin gear 1 according to a first embodiment of the present invention. FIG. 1A is a front view of the resin gear 1, FIG. 1B is a cross-sectional view of the resin gear 1 taken along a line A1-A1 in FIG. 1A, and FIG. 1C is a back view of the resin gear 1.

The resin gear 1 illustrated in FIG. 1 includes a circular plate-shaped web 2, a cylindrically-shaped boss 3 formed on a radially inward end of the web 2, a first tooth portion 5 including a plurality of teeth 4 formed on one side surface 2a side of the web 2 and an outer peripheral surface of the boss 3, a cylindrically-shaped rim 6 positioned on a radially outward end of the web 2 concentrically with the boss 3, and a second tooth portion 8 including a plurality of teeth 7 formed on an outer peripheral surface of the rim 6. The resin gear 1 has a first annular rib 10 formed on another side surface 2b of the web 2 and near the boss 3 concentrically with the boss 3. The resin gear 1 has a second annular rib 11 formed on the other side surface 2b of the web 2 and between the first annular rib 10 and the rim 6 concentrically with the rim 6. The resin gear 1 according to the embodiment is formed of a reinforcing fiber containing resin material (for example, POM (polyacetal) and PA66 (polyamide 66) containing a reinforcing fiber such as a glass fiber), or a resin material without the reinforcing fiber (for example, POM (polyacetal) and PA66 (polyamide 66)) by an injection molding.

As illustrated in FIG. 1, the boss 3 is a cylindrical body integrally formed at the radially inward end of the circular plate-shaped web 2, formed so as to bulge from the one side surface 2a of the web 2 to a right direction in FIG. 1B (a −Z-axis direction in FIG. 1B, and has a shaft hole 12 at the center. This boss 3 is formed having a shaft center CL of the shaft hole 12 as the center of the boss 3 and the center of the resin gear 1.

Figure 2B:
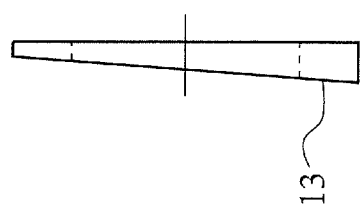
Figure 2A:
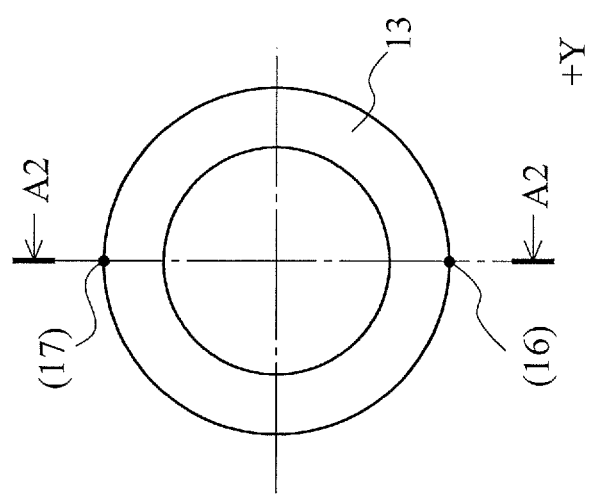

As illustrated in FIG. 1, the web 2 has an inner web portion 13 that couples the first annular rib 10 to the second annular rib 11 along the radial direction, and an outer web portion 14 that couples the second annular rib 11 to the rim 6 along the radial direction. The inner web portion 13 is formed to have a thickness gradually reduced from one intersection point 16 toward another intersection point 17 among a pair of intersection points 16 and 17 of a virtual radial direction line 15, which passes through the center (CL) of the boss 3 and extends in the radial direction, with an inner peripheral surface 11b of the second annular rib 11 (see FIG. 2), and the inner web portion 13 has a wedge shape as illustrated in FIG. 2B and FIG. 2C. Then, the inner web portion 13 is formed to have the thickness on the other intersection point 17 side (a position excluding a fillet portion formed of an R curved surface) thinner than a thickness (t1) of a portion on which the second annular rib 11 is formed (the second annular rib 11 and the web 2 on which the second annular rib 11 is formed). The inner web portion 13 includes two pairs of radial direction ribs 18 on the other intersection point 17 side having the virtual radial direction line 15 as a symmetry axis, the radial direction ribs 18 coupling the first annular rib 10 to the second annular rib 11 in the radial direction. These radial direction ribs 18 are formed at regular intervals along a circumferential direction of an outer peripheral surface 10a of the first annular rib 10. Then, the radial direction rib 18 is formed to have the thickness equal to or less than the thickness of the portion that has the thinnest thickness of the inner web portion 13. The outer web portion 14 is formed to have an even thickness excluding a portion coupled to the second annular rib 11 and a portion coupled to the rim 6, and formed to be thinner than the thickness (t1) of the portion on which the second annular rib 11 is formed. Note that, in the embodiment, the inner web portion 13 has an end portion on the one intersection point 16 side positioned on a side surface 1la of the second annular rib 11. The outer web portion 14 is not limited to the shape illustrated in FIG. 1, and its thickness may be varied along the radial direction and/or the circumferential direction. While, in FIG. 1, the resin gear 1 has the thickness of the portion on which the first annular rib 10 is formed and the thickness of the portion on which the second annular rib 11 is formed that are identical as t1, the thickness of the portion on which the first annular rib 10 is formed and the thickness of the portion on which the second annular rib 11 is formed may be different. The two pairs of the radial direction ribs 18 are not necessarily formed having the virtual radial direction line 15 as the symmetry axis, and it is only necessary that at least one pair or more of the radial direction ribs 18 are formed.

As illustrated in FIG. 1, the rim 6 is a cylindrical body integrally formed on the radially outward end of the circular plate-shaped web 2, and formed to be concentric with the boss 3. This rim 6 has a center in a tooth-width direction coupled to a radially outward end of the outer web portion 14.

As illustrated in FIG. 1, the first tooth portion 5 and the second tooth portion 8 are spur teeth in involute tooth profiles. When the pair of intersection points 16 and 17 of the virtual radial direction line 15, passing through the center (CL) of the boss 3 and extending in the radial direction, with the inner peripheral surface 11b of the second annular rib 11 are distinguished into the one intersection point 16 and the other intersection point 17, the centers (tooth-tip centers) of one tooth 4 and one tooth 7 in tooth-thickness directions are positioned on the virtual radial direction line 15 extending from the center (CL) of the boss 3 to the one intersection point 16 side.

As illustrated in FIG. 1, the first annular rib 10 has an inner peripheral surface 10b and the outer peripheral surface 10a concentric with the center (CL) of the boss 3, and the first annular rib 10 is a ring-shaped protrusion bulged to a left side (a+Z-axis direction in FIG. 1B) from the other side surface 2b (the side surface 2b on the left side in FIG. 1B) of the web 2. Then, as illustrated in FIG. 1B, this first annular rib 10 is positioned such that its side surface 10c is displaced off a side surface 6a of the rim 6 slightly inward (to the −Z-axis direction side). When the pair of intersection points 16 and 17 of the virtual radial direction line 15, passing through the center (CL) of the boss 3 and extending in the radial direction, with the inner peripheral surface 11b of the second annular rib 11 are distinguished into the one intersection point 16 and the other intersection point 17, this side surface 10c of the first annular rib 10 has only one gate mark 20 of the injection molding at a position on a radially outer side with respect to the first tooth portion 5 and a position biased to the other intersection point 17 on the virtual radial direction line 15. The first annular rib 10 is not limited to the shape illustrated in FIG. 1, and may be formed such that the side surface 10c is positioned identical to the side surface 6a of the rim 6, or the side surface 10c is positioned to be displaced off the side surface 6a of the rim 6 to the outside (the +Z-axis direction).

As illustrated in FIG. 1, the second annular rib 11 is similar to the first annular rib 10 in a point that the inner peripheral surface 11b and an outer peripheral surface 11c are concentric with the center (CL) of the boss 3, and the second annular rib 11 is a ring-shaped protrusion bulged to the left side (the +Z-axis direction in FIG. 1B) from the other side surface 2b (the side surface on the left side in FIG. 1B) of the web 2. In the resin gear 1 according to the embodiment, the thickness of the portion on which the second annular rib 11 is formed is thicker than the thickness of the surrounding web 2, and identical to the thickness of the portion on which the first annular rib 10 is formed. The second annular rib 11 has a width dimension along the radial direction larger than a width dimension of the first annular rib 10 along the radial direction (has a larger volume). Accordingly, the second annular rib 11 is configured to easily accumulate molten resin flowing in a cavity portion corresponding to the inner web portion 13 radially outward in the injection molding (has a great effect on damming the molten resin). The second annular rib 11 is not limited to the shape illustrated in FIG. 1, and may be formed such that the side surface 11a is positioned identical to the side surface 6a of the rim 6, or the side surface 11a is positioned to be displaced off the side surface 6a of the rim 6 to the outside (the +Z-axis direction). The second annular rib 11 may be formed to have a height different from a height of the first annular rib 10.

As illustrated in FIG. 1, the radial direction rib 18 is disposed to reinforce a thin walled side (the other intersection point 17 side) of the inner web portion 13. However, the radial direction rib 18 is configured to have a thickness dimension equal to or less than the thickness of the portion where the thickness of the inner web portion 13 is thinnest such that the molten resin injected into a cavity portion forming the first annular rib 10 does not flow to a side of a cavity portion forming the second annular rib 11 without filling up respective cavity portions forming the boss 3, the first tooth portion 5, and the inner web portion 13.

(Modification)

FIG. 3 includes drawings illustrating a resin gear 1 according to a modification of the above-described first embodiment. FIG. 3A is a front view of the resin gear 1, FIG. 3B is a cross-sectional view of the resin gear 1 taken along a line A3-A3 in FIG. 3A, and FIG. 3C is a back view of the resin gear 1.

As illustrated in FIG. 3, the resin gear 1 according to the modification is similar to the resin gear 1 according to the above-described first embodiment except that the radial direction rib 18 reinforcing the inner web portion 13 is omitted. The resin gear 1 according to the modification is employed when a torque acting on the second tooth portion 8 is smaller than a torque acting on the second tooth portion 8 of the resin gear 1 according to the first embodiment, and when a strength of the inner web 13 is endurable against the torque acting on the second tooth portion 8. For the resin gear 1 according to the modification, identical reference numerals are attached to configuration parts identical to those of the above-described resin gear 1 according to the first embodiment, and therefore the following omits the explanations overlapping with those of the above-described resin gear 1 according to the first embodiment.

(Injection Molding Method for Resin Gear)

Figure 4B:
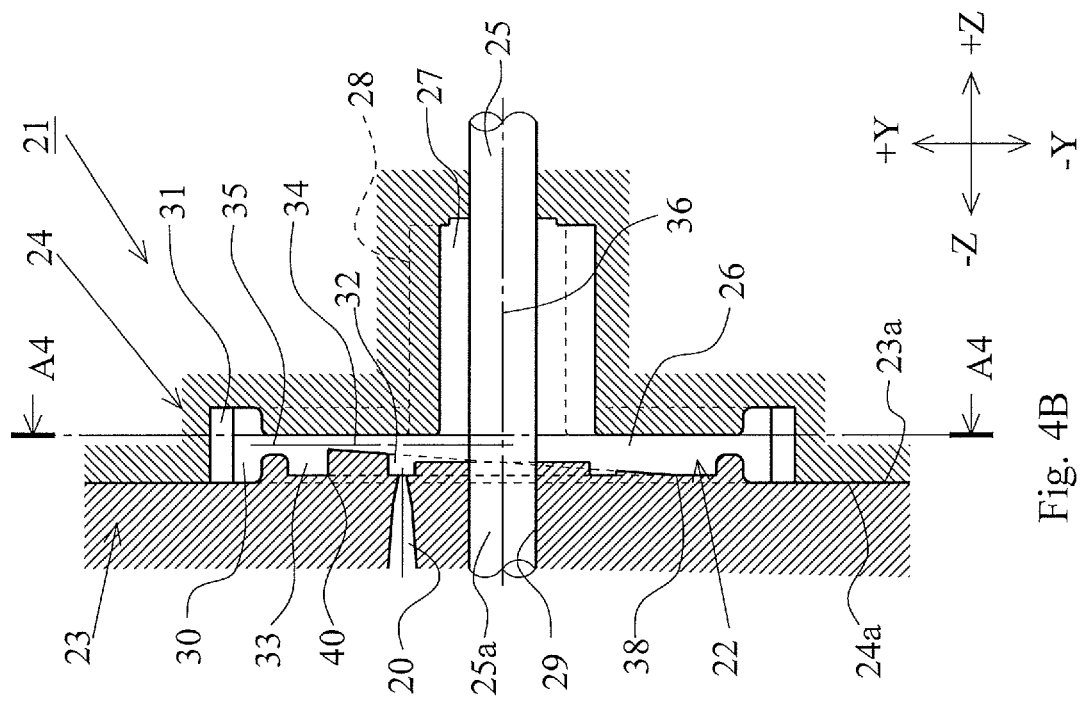
FIGS. 4A and 4B include drawings describing an injection molding method for the resin gear according to the first embodiment of the present invention.
Figure 4A:
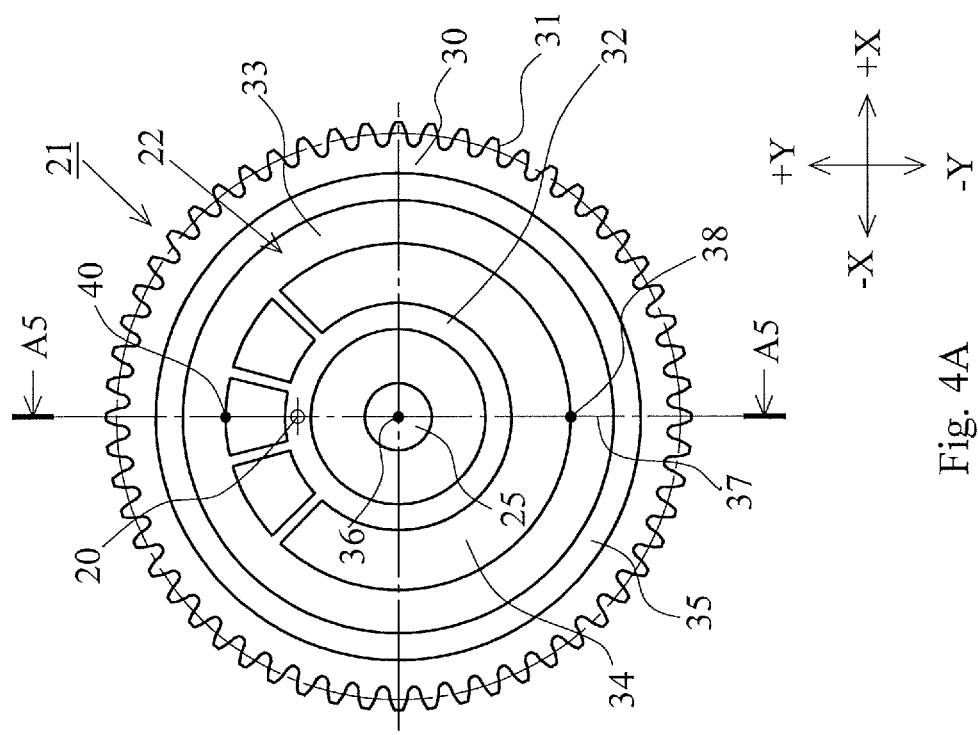

FIG. 4 includes drawings describing an injection molding method for the resin gear 1 according to the embodiment. FIG. 4A is a plan view of a cavity 22 illustrating by taking a mold 21 (a mold 21 on which a mold clamping has been performed) for an injection molding along a line A4-A4 in FIG. 4B, and FIG. 4B is a cross-sectional view of the mold 21 for the injection molding taken along a line A5-A5 in FIG. 4A.

As illustrated in FIG. 4, the mold 21 is roughly divided into a fixed side mold 23 that includes a gate 20 and a movable side mold 24 movable with respect to this fixed side mold 23. Then, the mold 21 includes the cavity 22 for performing the injection molding on the resin gear 1 on mold mating surfaces 23a and 24a sides of the fixed side mold 23 and the movable side mold 24. The mold 21 is configured such that a shaft mold 25 secured to the movable side mold 24 side projects through the cavity 22, a distal end surface 25a of the shaft mold 25 is engaged with a shaft mold support hole 29 of the fixed side mold 23, and the shaft mold 25 forms the shaft hole 12 of the boss 3 (see FIG. 1). The shaft mold 25 may have the distal end configured to abut on an inner surface of the cavity 22.

The cavity 22 of the mold 21 has a first cavity portion 26 for forming the circular plate-shaped web 2, a second cavity portion 27 for forming the cylindrically-shaped boss 3 positioned at the radially inward end of the web 2, a third cavity portion 28 forming the first tooth portion 5 positioned on the one side surface 2a side of the web 2 and on the outer peripheral surface of the boss 3 and including a plurality of the teeth 4, a fourth cavity portion 30 forming the cylindrically-shaped rim 6 positioned at the radially outward end of the web 2 and concentric with the boss 3, a fifth cavity portion 31 forming the second tooth portion 8 positioned on the outer peripheral surface of the rim 6 and including a plurality of the teeth 7, a sixth cavity portion 32 forming the first annular rib 10 positioned on the other side surface 2b of the web 2 and in proximity to the boss portion 3, and a seventh cavity portion 33 forming the second annular rib 11 positioned on the other side surface 2b of the web 2 and between the first annular rib 10 and the rim 6. The first cavity portion 26 has an inner-web-portion cavity portion 34 forming the inner web portion 13 that couples the first annular rib 10 to the second annular rib 11, and an outer-web-portion cavity portion 35 forming the outer web portion 14 that couples the second annular rib 11 to the rim 6.

When, on the mold 21, a pair of intersection points 38 and 40 of a virtual radial direction line 37, which is perpendicular to a center 36 of the second cavity portion 27 and extends in a radial direction, with a radially inward end of the seventh cavity portion 33 are defined as one intersection point 38 and another intersection point 40, only one gate 20 (a pinpoint gate) for the injection molding is formed to open at a position on the radially outer side with respect to the third cavity portion 28 and a position biased to the other intersection point 40 on the virtual radial direction line 37, on the sixth cavity portion 32.

The resin gear 1 according to the embodiment is formed by the injection molding using the mold 21 configured as described above. That is, in FIG. 4, the molten resin injected from the gate 20 into the sixth cavity portion 32 forming the first annular rib 10 approximately concentrically diffuses radially outward from the opening position of the gate 20, and flows in the second cavity portion 27 forming the boss 3, the third cavity portion 28 forming the first tooth portion 5, and the inner-web-portion cavity portion 34 forming the inner web portion 13. This molten resin flowing in the inner-web-portion cavity portion 34 easily flow to the one intersection point 38 side far from the gate 20 due to a space in the inner-web-portion cavity portion 34 narrowed from the one intersection point 38 toward the other intersection point 40 (narrowed in a wedge shape). Then, the flow biased to the one intersection point 38 far from the gate 20 is accelerated while the flow on the other intersection point 40 side close to the gate 20 is suppressed. Consequently, for the molten resin flowing in the inner-web-portion cavity portion 34, a variation of a time period for reaching the seventh cavity portion 33 forming the second annular rib 11 can be reduced regardless of differences in distance from the opening position of the gate 20 to the radially inward end of the seventh cavity portion 33 forming the second annular rib 11.

The molten resin flowing in the inner-web-portion cavity portion 34 flows into the seventh cavity portion 33 forming the second annular rib 11, and is accumulated. The molten resin accumulated in the seventh cavity portion 33 forming the second annular rib 11 approximately simultaneously flows out radially outward from the whole circumference of the seventh cavity portion 33, and a flow velocity is uniformized in flowing in the outer-web-portion cavity portion 35. The molten resin whose flow velocity has been uniformized in the outer-web-portion cavity portion 35 flows inside the fourth cavity portion 30 forming the rim 6 approximately concentrically and diffusing radially outward, and subsequently, the molten resin is approximately simultaneously filled into the fifth cavity portion 31 forming the second tooth portion 8 as a final filling portion.

(Effects of the Embodiment)

As described above, even the resin gear 1 according to the embodiment is formed by the injection molding with one gate 20, the molten resin injected from the gate 20 flows in the fourth cavity portion 30 forming the rim 6 on the radially outward end side while concentrically diffusing, and the molten resin is approximately simultaneously filled into the fifth cavity portion 31, the final filling portion, forming the second tooth portion 8 on the outer peripheral side of the rim 6. Accordingly, the resin gear 1 according to the embodiment has an excellent shape accuracy such as a roundness and can reduce an occurrence of a weld line, thus ensuring the improvement of the usage efficiency of the resin material. This resin gear 1 according to the embodiment provides a large effect on the injection molding using a reinforcing fiber containing resin.

The resin gear 1 according to the embodiment has the tooth-tip centers of the teeth 4 and 7, which are one tooth 4 and one tooth 7 of the first tooth portion 5 and the second tooth portion 8 and positioned farthest from the gate 20, positioned on the virtual radial direction line 15 passing through the center (CL) of the boss 3 and extending in the radial direction (toward the one intersection point 16). Accordingly, even when the weld line occurs, the weld line is positioned on the tooth-tip centers, and the weld line is not positioned at tooth roots (a portion on which a largest stress acts when the teeth engage with one another). Consequently, even when the weld line occurs due to the injection molding with the one gate 20, the resin gear 1 according to the embodiment is less likely to be damaged on the tooth by the weld line. This resin gear 1 according to the embodiment provides a large effect on the injection molding using a reinforcing fiber containing resin.

On the resin gear 1 according to the embodiment, the inner web portion 13 is formed to have the thickness gradually decreased from the one intersection point 16 toward the other intersection point 17 among the pair of the intersection points 16 and 17 of the virtual radial direction line 15, passing through the center (CL) of the boss 3 and extending in the radial direction, with the second annular rib 11, and the thickness decreases from the gate 20 toward the other intersection point 17 (the intersection point 17 close to the gate 20) while the thickness increases from the gate 20 toward the one intersection point 16 (the intersection point 16 far from the gate 20). Consequently, with the resin gear 1 according to the embodiment, the inner web portion 13 can reduce the flow of the molten resin at the position close to the gate 20 while accelerating the flow of the molten resin at the position far from the gate 20, thus ensuring the reduction of the variation of the time period where the molten resin injected from the gate 20 reaches the second annular rib 11.

The resin gear 1 according to the embodiment has the center of the rim 6 in the tooth-width direction coupled to the radially outward end of the outer web portion 14. Accordingly, when the resin gear 1 is formed by the injection molding with the reinforcing fiber containing resin, identical fiber orientations are provided at both ends of the rim 6 and the second tooth portion 8 in the tooth-width direction without a variation of the strength at both ends of the rim 6 and the second tooth portion 8 in the tooth-width direction.

The resin gear 1 according to the embodiment has the gate 20 positioned radially outward with respect to the third cavity portion 28 forming the first tooth portion 5, and the gate 20 configured to open to the sixth cavity portion 32 forming the first annular rib 10 and the first cavity portion 26 forming the web 2. Accordingly, the flow of the molten resin approximately concentrically diffusing from the gate 20 is easily generated, thus, in combination with the above-described shape effect of the inner web portion 13, ensuring reducing the variation of the flow velocity of the molten resin from the gate 20 to the rim 6 and the second tooth portion 8.

[Second Embodiment]

Figure 5A:
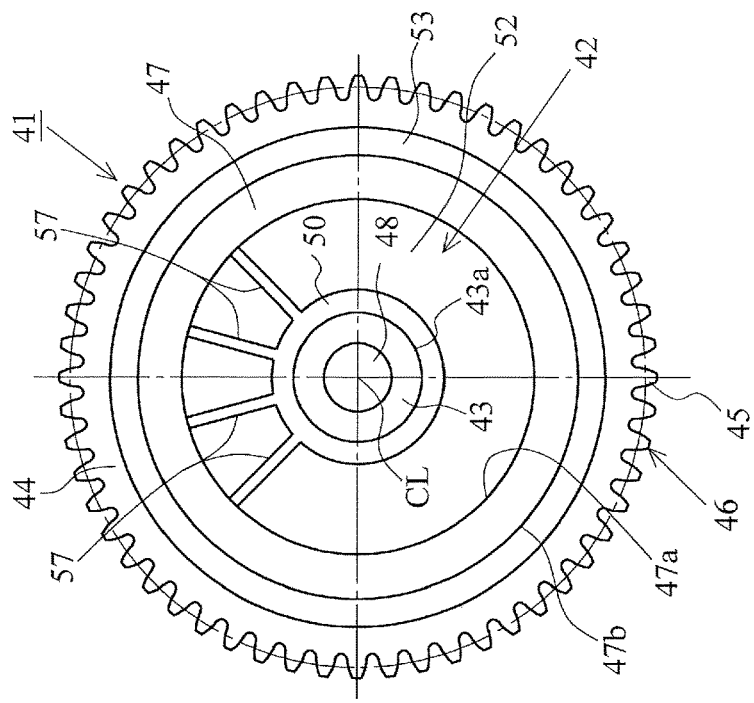
FIGS. 5A-5C include drawings illustrating a resin gear according to a second embodiment of the present invention.
Figure 5B:
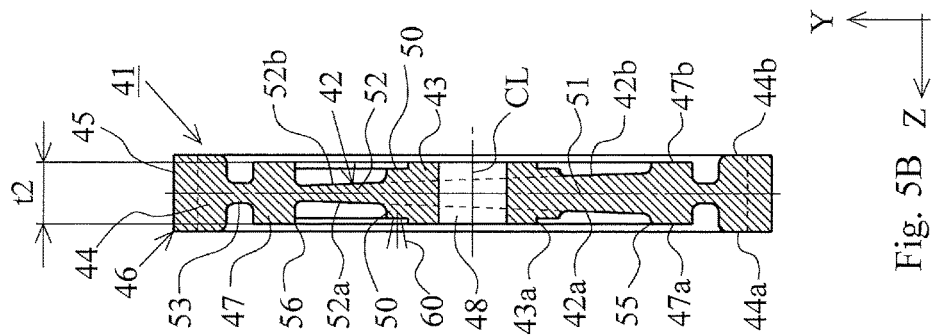
Figure 5C:
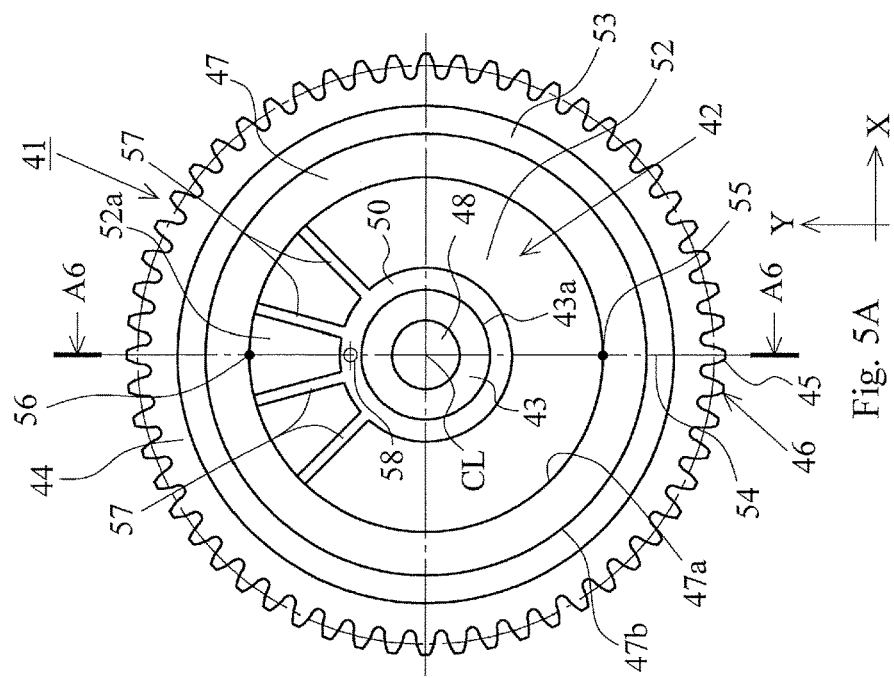

FIG. 5 includes drawings illustrating a resin gear 41 according to a second embodiment of the present invention. FIG. 5A is a front view of the resin gear 41, FIG. 5B is a cross-sectional view of the resin gear 41 taken along a line A6-A6 in FIG. 5A, and FIG. 5C is a back view of the resin gear 41.

The resin gear 41 illustrated in FIG. 5 includes a circular plate-shaped web 42, a cylindrically-shaped boss 43 formed on a radially inward end of the web 42, a cylindrically-shaped rim 44 positioned on a radially outward end of the web 42 concentrically with the boss 43, and a tooth portion 46 including a plurality of teeth 45 formed on an outer peripheral surface of the rim 44. The resin gear 41 includes respective annular ribs 47, which are concentric with the boss 43, formed on both side surfaces of the web 42 at positions between the boss 43 and the rim 44 and biased to the rim 44. The resin gear 41 is formed such that a shaft center CL of a shaft hole 48 formed at the center of the boss 43 comes to the center of the boss 43, and comes to the center of the resin gear 41. The resin gear 41 is formed in a linearly symmetrical shape having a center line 51 (a center line parallel to a virtual radial direction line 54) as a symmetry axis, the center line 51 passing through the center of the tooth portion 46 in the tooth-width direction and being perpendicular to the shaft center CL of the shaft hole 48 (see FIG. 5B). The resin gear 41 according to the embodiment is formed of a reinforcing fiber containing resin material (for example, POM (polyacetal) and PA66 (polyamide 66) containing a reinforcing fiber such as a glass fiber), or a resin material without the reinforcing fiber (for example, POM (polyacetal) and PA66 (polyamide 66)) by an injection molding, similarly to the resin gear 1 according to the first embodiment.

In the resin gear 41 illustrated in FIG. 5, the web 42 has an inner web portion 52 that couples the boss 43 to the annular rib 47 along a radial direction, and an outer web portion 53 that couples the annular rib 47 to the rim 44 along the radial direction. The inner web portion 52 is formed to have a thickness gradually reduced from one intersection point 55 toward another intersection point 56 among a pair of intersection points 55 and 56 of the virtual radial direction line 54, passing through the center (CL) of the boss 43 and extending in the radial direction, with the annular rib 47, and the inner web portion 52 has a wedge shape. Then, the inner web portion 52 is formed to have the thickness on the other intersection point 56 side thinner than a thickness (t2) of a portion on which the annular rib 47 is formed (the annular ribs 47 and 47 and the web 42 on which this pair of the annular ribs 47 and 47 are formed). Respective annular gate-receiving protrusions 50 concentric with the boss 43 are formed at corner portions of both side surfaces of the web 42 (both side surfaces 52a and 52b of the inner web portion 52) and an outer peripheral surface 43a of the boss 43, and the gate-receiving protrusions 50 are each formed across the web 42 (the inner web portion 52) and the boss 43. One of both gate-receiving protrusions 50 has a surface on which only one gate mark 58 of the injection molding is formed at a position biased to the other intersection point 56 on the virtual radial direction line 54. The inner web portion 52 has the thickness on the one intersection point 55 side slightly decreased compared with a tooth-width dimension of the tooth portion 46. The inner web portion 52 has two pairs of radial direction ribs 57 having the virtual radial direction line 54 as a symmetry axis on the other intersection point 56 side, the radial direction ribs 57 coupling the gate-receiving protrusion 50 to the annular rib 47 in the radial direction. These radial direction ribs 57 are formed at regular intervals along a circumferential direction of the outer peripheral surface 43a of the boss 43. Then, the radial direction rib 57 is formed to have the thickness equal to or less than the thickness of a portion that has the thinnest thickness of the inner web portion 52. The outer web portion 53 is formed to have an even thickness excluding a portion coupled to the annular rib 47 and a portion coupled to the rim 44, and formed to be thinner than the thickness (t2) of the portion on which the annular rib 47 is formed. Note that, the inner web portion 52 is not limited to the shape illustrated in FIG. 5, and the thickness on the one intersection point 55 side may be formed to be identical to the tooth-width dimension of the tooth portion 46, or the thickness on the one intersection point 55 side may be formed to be larger than the tooth-width dimension of the tooth portion 46. The outer web portion 53 is not limited to the shape illustrated in FIG. 5, and the thickness may be varied along the radial direction and/or the circumferential direction. The resin gear 41 may have the thickness (t2) of the portion on which the annular ribs 47 and 47 are formed identical to the tooth-width dimension of the tooth portion 46 or larger than the tooth-width dimension of the tooth portion 46. The two pairs of the radial direction ribs 57 are not necessarily formed having the virtual radial direction line 54 as the symmetry axis, and it is only necessary that at least one pair or more of the radial direction ribs 57 are formed.

As illustrated in FIG. 5, the rim 44 is a cylindrical body integrally formed on the radially outward end of the circular plate-shaped web 42, and formed to be concentric with the boss 43. This rim 44 has a center in a tooth-width direction coupled to a radially outward end of the outer web portion 53.

As illustrated in FIG. 5, the tooth portion 46 is a spur tooth in an involute tooth profile. When the pair of the intersection points 55 and 56 of the virtual radial direction line 54, passing through the center (CL) of the boss 43 and extending in the radial direction, with the annular rib 47 are distinguished into the one intersection point 55 and the other intersection point 56, the center (tooth-tip center) of one tooth 45 in a tooth-thickness direction is positioned on the virtual radial direction line 54 extending from the center (CL) of the boss 43 to the one intersection point 55 side.

As illustrated in FIG. 5, the annular rib 47 has an inner peripheral surface 47a and an outer peripheral surface 47b concentric with the center (CL) of the boss 43, and the annular rib 47 is a ring-shaped protrusion bulged from both side surfaces 42a and 42b of the web 42 along a Z-axis direction (see FIG. 5B). Then, as illustrated in FIG. 5B, this annular rib 47 is positioned such that its both side surfaces 47a and 47b are displaced off both side surfaces 44a and 44b of the rim 44 slightly inward. In the resin gear 41 according to the embodiment, the thickness (t2) of the portion on which this annular rib 47 is formed is thicker than the thickness of the outer web portion 53, thus easily accumulating molten resin injected from the gate 60 (providing a great effect on damming the molten resin).

As illustrated in FIG. 5, the radial direction rib 57 is disposed to reinforce a thin walled side of the inner web portion 52. However, the radial direction rib 57 is configured to have a thickness dimension equal to or less than the thickness of the portion where the thickness of the inner web portion 52 is thinnest such that the molten resin injected into a cavity portion forming the gate-receiving protrusion 50 does not flow to a side of a cavity portion forming the annular rib 47 without filling up the boss 43.

(Modification)

Figure 6C:
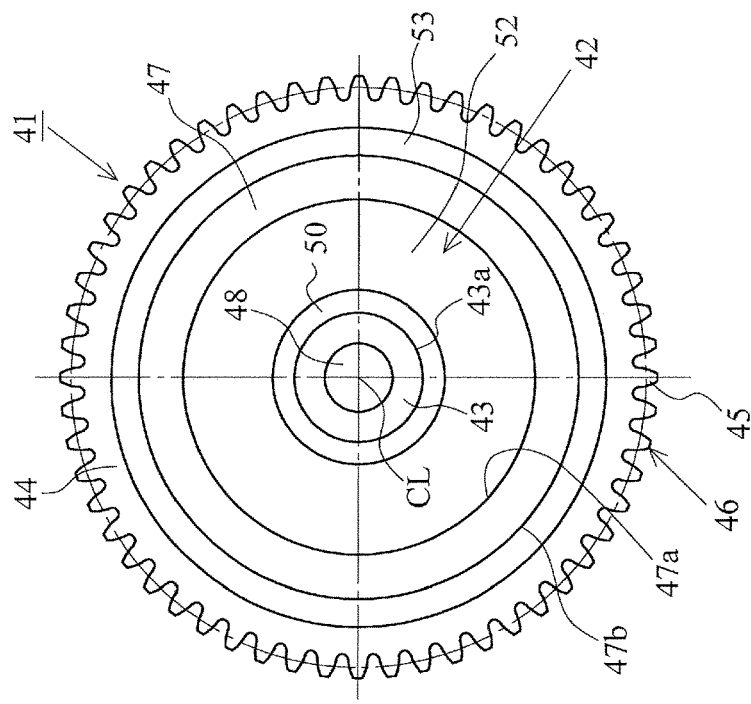
FIGS. 6A-6C include drawings illustrating a resin gear according to a modification of the second embodiment.
Figure 6B:
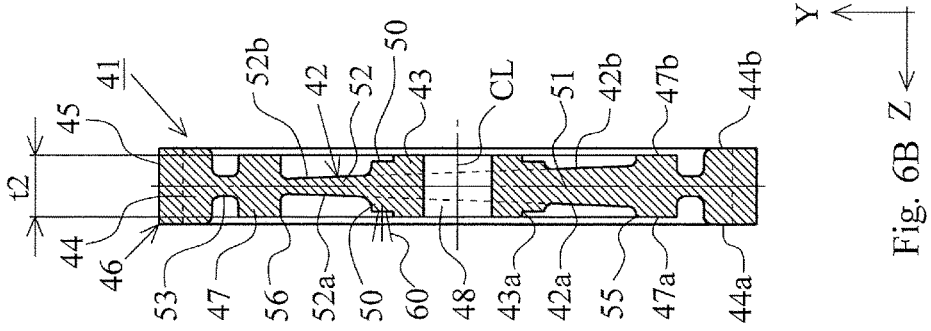
Figure 6A:
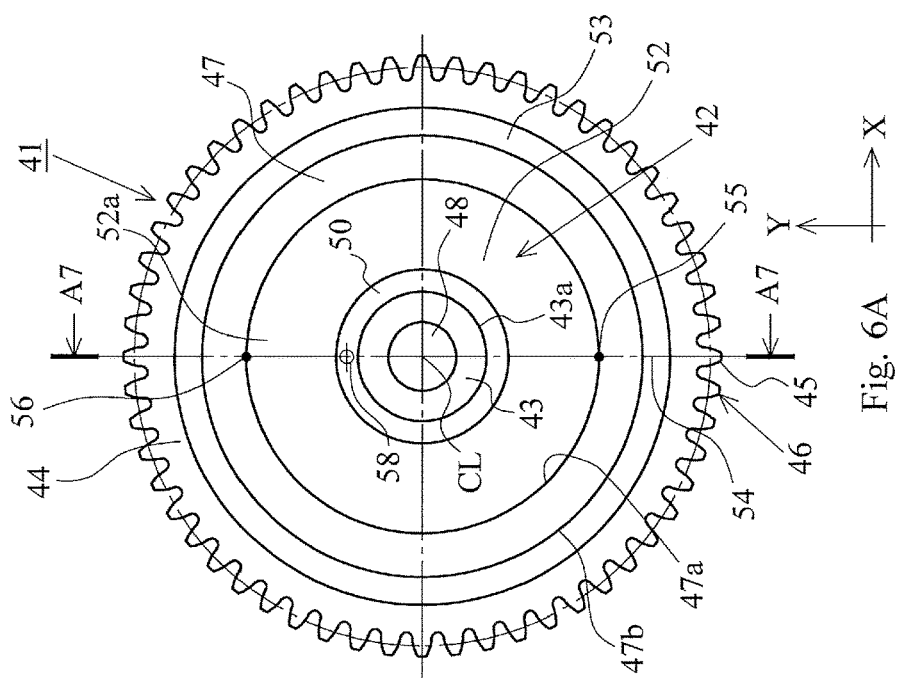

FIG. 6 includes drawings illustrating a resin gear 41 according to a modification of the above-described second embodiment. FIG. 6A is a front view of the resin gear 41, FIG. 6B is a cross-sectional view of the resin gear 41 taken along a line A7-A7 in FIG. 6A, and FIG. 6C is a back view of the resin gear 41.

As illustrated in FIG. 6, the resin gear 41 according to the modification is similar to the resin gear 41 according to the above-described second embodiment except that the radial direction rib 57 reinforcing the inner web portion 52 is omitted. The resin gear 41 according to the modification is employed when a torque acting on the tooth portion 46 is smaller than a torque acting on the tooth portion 46 of the resin gear 41 according to the second embodiment, and when a strength of the inner web portion 52 is endurable against the torque acting on the tooth portion 46. For the resin gear 41 according to the modification, identical reference numerals are attached to configuration parts identical to those of the above-described resin gear 41 according to the second embodiment, and therefore the following omits the explanations overlapping with those of the above-described resin gear 41 according to the second embodiment.

(Injection Molding Method for Resin Gear)

FIG. 7 includes drawings describing an injection molding method for the resin gear 41 according to the embodiment. FIG. 7A is a plan view of a cavity 62 illustrating by taking a mold 61 (a mold 61 on which a mold clamping has been performed) for an injection molding along a line A8-A8 in FIG. 7B, and FIG. 7B is a cross-sectional view of the mold 61 for the injection molding taken along a line A9-A9 in FIG. 7A.

As illustrated in FIG. 7, the mold 61 is roughly divided into a fixed side mold 63 that includes a gate 60 and a movable side mold 64 movable with respect to this fixed side mold 63. Then, the mold 61 includes the cavity 62 for performing the injection molding of the resin gear 41 on mold mating surfaces 63a and 64a sides of the fixed side mold 63 and the movable side mold 64. The mold 61 is configured such that a shaft mold 65 secured to the movable side mold 64 side projects through the cavity 62, a distal end surface 65a side of the shaft mold 65 is engaged with a shaft mold support hole 69 of the fixed side mold 63, and the shaft mold 65 forms the shaft hole 48 of the boss 43 (see FIG. 5). The shaft mold 65 may have a distal end 65a configured to abut on an inner surface of the cavity 62.

The cavity 62 of the mold 61 has a first cavity portion 66 for forming the circular plate-shaped web 42, a second cavity portion 67 for forming the cylindrically-shaped boss 43 positioned at the radially inward end of the web 42, a third cavity portion 68 forming the cylindrically-shaped rim 44 positioned at the radially outward end of the web 42 and concentric with the boss 43, a fourth cavity portion 70 forming the tooth portion 46 positioned on the outer peripheral surface of the rim 44 and including a plurality of the teeth 45, a fifth cavity portion 71 forming the annular rib 47 concentric with the rim 44 on the web 42, and a sixth cavity portion 72 forming the gate-receiving protrusions 50 positioned at the corner portions of both side surfaces 52a and 52b of the inner web portion 52 and the outer peripheral surface 43a of the boss 43. The first cavity portion 66 has an inner-web-portion cavity portion 73 forming the inner web portion 52 that couples the boss 43 to the annular rib 47, and an outer-web-portion cavity portion 74 forming the outer web portion 53 that couples the annular rib 47 to the rim 44.

When, on the mold 61, a pair of intersection points 77 and 78 of a virtual radial direction line 76, perpendicular to a center 75 of the second cavity portion 67 and extending in a radial direction, with the fifth cavity portion 71 are defined as one intersection point 77 and another intersection point 78, only one gate 60 (a pinpoint gate) for the injection molding is formed to open on the virtual radial direction line 76 of the sixth cavity portion 72. This gate 60 for the injection molding opens at a position on the virtual radial direction line 76 and biased to the other intersection point 78.

The resin gear according to the embodiment is formed by the injection molding using the mold 61 configured as described above. That is, in FIG. 7, the molten resin injected from the gate 60 into the sixth cavity portion 72 approximately concentrically diffuses in the first cavity portion 66 radially outward from the opening position of the gate 60, and flows in the second cavity portion 67 forming the boss 43, and the inner-web-portion cavity portion 73 forming the inner web portion 52. This molten resin flowing in the inner-web-portion cavity portion 73 easily flow to the one intersection point 77 side far from the gate 60 due to a space in the inner-web-portion cavity portion 73 narrowed from the one intersection point 77 toward the other intersection point 78 (narrowed in a wedge shape). Then, the flow biased to the one intersection point 77 far from the gate 60 is accelerated while the flow on the other intersection point 78 side close to the gate 60 is suppressed. Consequently, for the molten resin flowing in the inner-web-portion cavity portion 73, a variation of a time period for reaching the fifth cavity portion 71 forming the annular rib 47 can be reduced regardless of differences in distance from the opening position of the gate 60 to the radially inward end of the fifth cavity portion 71 forming the annular rib 47.

The molten resin flowing in the inner-web-portion cavity portion 73 flows into the fifth cavity portion 71 forming the annular rib 47, and is accumulated. The molten resin accumulated in the fifth cavity portion 71 forming the annular rib 47 approximately simultaneously flows out radially outward from the whole circumference of the fifth cavity portion 71, and a flow velocity is uniformized in flowing in the outer-web-portion cavity portion 74. The molten resin whose flow velocity has been uniformized in the outer-web-portion cavity portion 74 flows inside the third cavity portion 68 forming the rim 44 approximately concentrically and diffusing radially outward, and subsequently, the molten resin is approximately simultaneously filled into the fourth cavity portion 70 forming the tooth portion 46.

(Effects of the Embodiment)

As described above, even the resin gear 41 according to the embodiment is formed by the injection molding with one gate 60, the molten resin injected from the gate 60 flows in the third cavity portion 68 forming the rim 44 on the radially outward end side while concentrically diffusing, and the molten resin is approximately simultaneously filled into the fourth cavity portion 70, forming the tooth portion 46 on the outer peripheral side of the rim 44, as a final filling portion. Accordingly, the resin gear 41 according to the embodiment has an excellent shape accuracy such as a roundness and can reduce an occurrence of a weld line, thus ensuring the improvement of the usage efficiency of the resin material. This resin gear 41 according to the embodiment provides a large effect on the injection molding using a reinforcing fiber containing resin.

The resin gear 41 according to the embodiment has the tooth-tip center of the tooth 45, which is one tooth 45 of the tooth portion 46 and positioned farthest from the gate 60, positioned on the virtual radial direction line 54 passing through the center (CL) of the boss 43 and extending in the radial direction (toward the one intersection point 55). Accordingly, even when the weld line occurs, the weld line is positioned on the tooth-tip center, and the weld line is not positioned at a tooth root (a portion on which a largest stress acts when the teeth engage with one another). Consequently, even when the weld line occurs due to the injection molding with the one gate 60, the resin gear 41 according to the embodiment is less likely to be damaged on the tooth by the weld line. This resin gear 41 according to the embodiment provides a large effect on the injection molding using a reinforcing fiber containing resin.

On the resin gear 41 according to the embodiment, the inner web portion 52 is formed to have the thickness gradually decreased from the one intersection point 55 toward the other intersection point 56 among the pair of the intersection points 55 and 56 of the virtual radial direction line 54, passing through the center (CL) of the boss 43 and extending in the radial direction, with the annular rib 47, and the thickness decreases from the gate 60 toward the other intersection point 56 (the intersection point 56 close to the gate 60) while the thickness increases from the gate 60 toward the one intersection point 55 (the intersection point 55 far from the gate 60). Consequently, with the resin gear 41 according to the embodiment, the inner web portion 52 can reduce the flow of the molten resin at the position close to the gate 60 while accelerating the flow of the molten resin at the position far from the gate 60, thus ensuring the reduction of the variation of the time period where the molten resin injected from the gate 60 reaches the fifth cavity portion 71 forming the annular rib 47.

The resin gear 41 according to the embodiment has the center of the rim 44 in the tooth-width direction coupled to the radially outward end of the outer web portion 53. Accordingly, when the resin gear 41 is formed by the injection molding with the reinforcing fiber containing resin, identical fiber orientations are provided at both ends of the rim 44 and the tooth portion 46 in the tooth-width direction without a variation of the strength at both ends of the rim 44 and the tooth portion 46 in the tooth-width direction.

The resin gear 41 according to the embodiment has the gate 60 positioned radially outward with respect to the second cavity portion 67 forming the boss 43, and the gate 60 configured to open to the sixth cavity portion 72 forming the gate-receiving protrusion 50 and the first cavity portion 66 forming the web 42. Accordingly, the flow of the molten resin approximately concentrically diffusing from the gate 60 is easily generated, thus, in combination with the above-described shape effect of the inner web portion 52, ensuring reducing the variation of the flow velocity of the molten resin from the gate 60 to the rim 44 and the tooth portion 46.

[Third Embodiment]

Figure 8A:
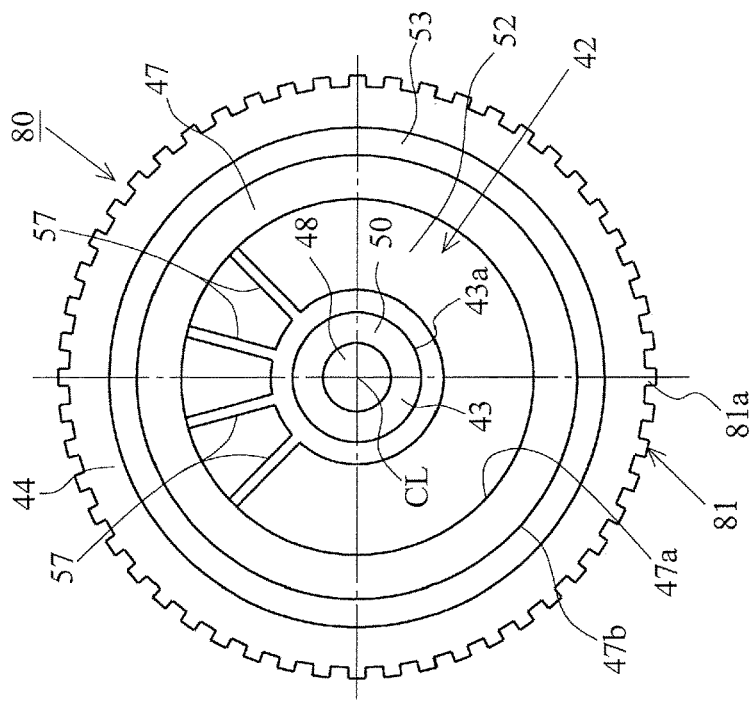
FIGS. 8A-8C include drawings illustrating a resin-tooth-provided belt pulley according to a third embodiment of the present invention.
Figure 8B:
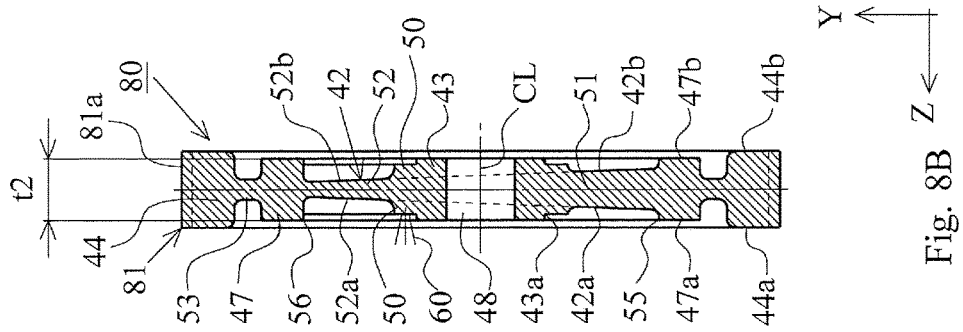
Figure 8C:
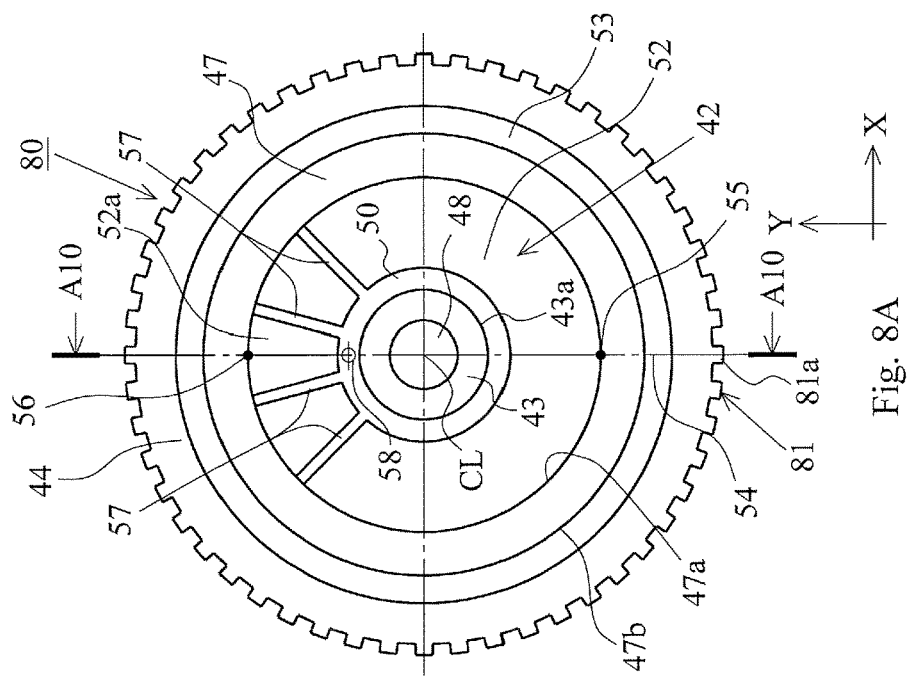

FIG. 8 includes drawings illustrating a resin-tooth-provided belt pulley 80 according to a third embodiment of the present invention. FIG. 8A is a front view of the resin-tooth-provided belt pulley 80, FIG. 8B is a cross-sectional view of the resin-tooth-provided belt pulley 80 taken along a line A10-A10 in FIG. 8A, and FIG. 8C is a back view of the resin-tooth-provided belt pulley 80.

The resin-tooth-provided belt pulley 80 according to the embodiment illustrated in FIG. 8 is configured by replacing the tooth portion 46 of the resin gear 41 according to the second embodiment illustrated in FIG. 5 with a tooth portion 81 including a plurality of teeth 81a meshing with a belt with teeth (not illustrated), and other configurations are similar to those of the resin gear 41 according to the second embodiment illustrated in FIG. 5. Then, for the resin-tooth-provided belt pulley 80 according to the embodiment illustrated in FIG. 8, identical reference numerals are attached to configuration parts similar to those of the resin gear 41 according to the second embodiment illustrated in FIG. 5, and therefore the following omits the explanations overlapping with those of the resin gear 41 according to the second embodiment.

The resin-tooth-provided belt pulley 80 according to the embodiment with such configuration has an excellent shape accuracy such as a roundness and can reduce an occurrence of a weld line similarly to the resin gear 41 according to the second embodiment, thus ensuring the improvement of the usage efficiency of the resin material.

[Fourth Embodiment]

Figure 9A:
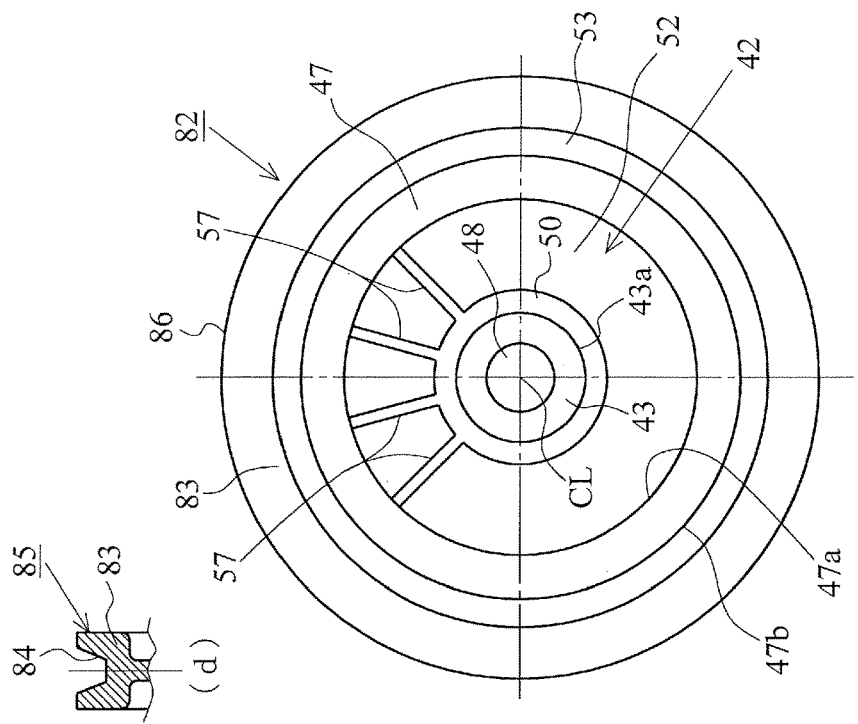
Figure 9B:
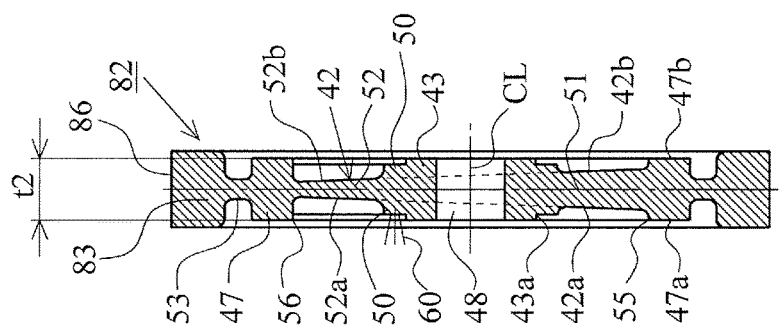
Figure 9C:
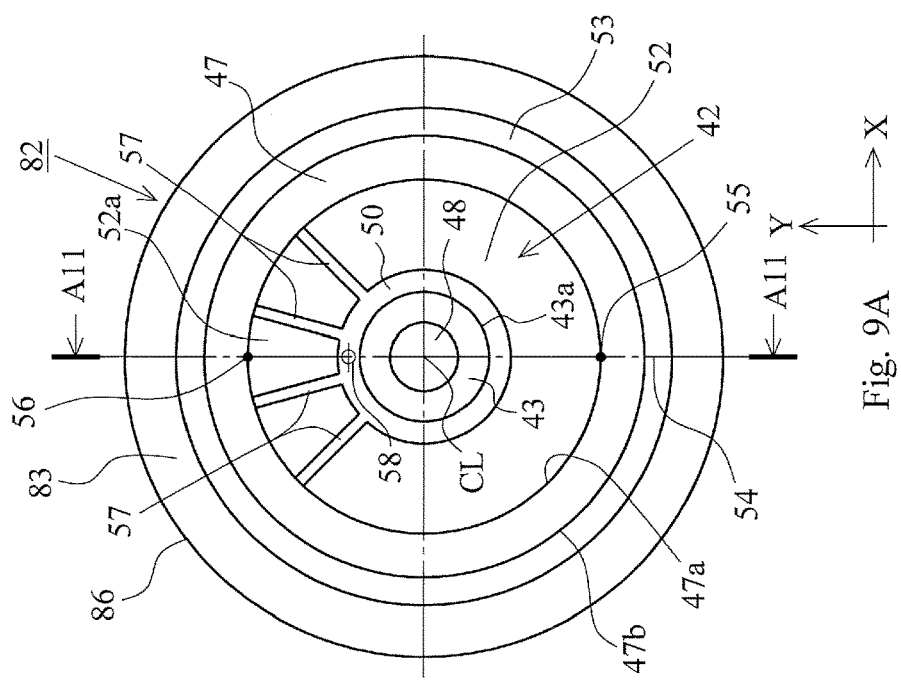

FIG. 9 includes drawings illustrating a resin rotator 82 according to a fourth embodiment of the present invention. FIG. 9A is a front view of the resin rotator 82, FIG. 9B is a cross-sectional view of the resin rotator 82 taken along a line A11-A11 in FIG. 9A, FIG. 9C is a back view of the resin rotator 82, and FIG. 9D is a partial cross-sectional view of the resin rotator 82 illustrating an application example to a resin V-belt pulley.

The resin rotator 82 according to the embodiment illustrated in FIG. 9 is configured by replacing the rim 44 and the tooth portion 46 of the resin gear 41 according to the second embodiment illustrated in FIG. 5 with an outer peripheral side tubular portion 83, and other configurations are similar to those of the resin gear 41 according to the second embodiment illustrated in FIG. 5. Then, for the resin rotator 82 according to the embodiment illustrated in FIG. 9, identical reference numerals are attached to configuration parts similar to those of the resin gear 41 according to the second embodiment illustrated in FIG. 5, and therefore the following omits the explanations overlapping with those of the resin gear 41 according to the second embodiment.

The resin rotator 82 with such configuration can configure the resin gear 41 according to the second embodiment by replacing the outer peripheral side tubular portion 83 with the rim 44 and the tooth portion 46. The resin rotator 82 can configure the resin-tooth-provided belt pulley 80 according to the third embodiment by replacing the outer peripheral side tubular portion 83 with the rim 44 and the tooth portion 81. The resin rotator 82 can configure a resin V-belt pulley 85 by forming a V-groove 84 on the outer peripheral side tubular portion 83. As illustrated in FIG. 9, the resin rotator 82 can be used as a roller when the outer peripheral side tubular portion 83 has an outer peripheral surface 86 formed as a circumferential surface concentric with the boss 43.

The resin rotator 82 according to the embodiment with such configuration has an excellent shape accuracy such as a roundness and can reduce an occurrence of a weld line similarly to the resin gear 41 according to the second embodiment, thus ensuring the improvement of the usage efficiency of the resin material.

[Fifth Embodiment]

Figure 10C:
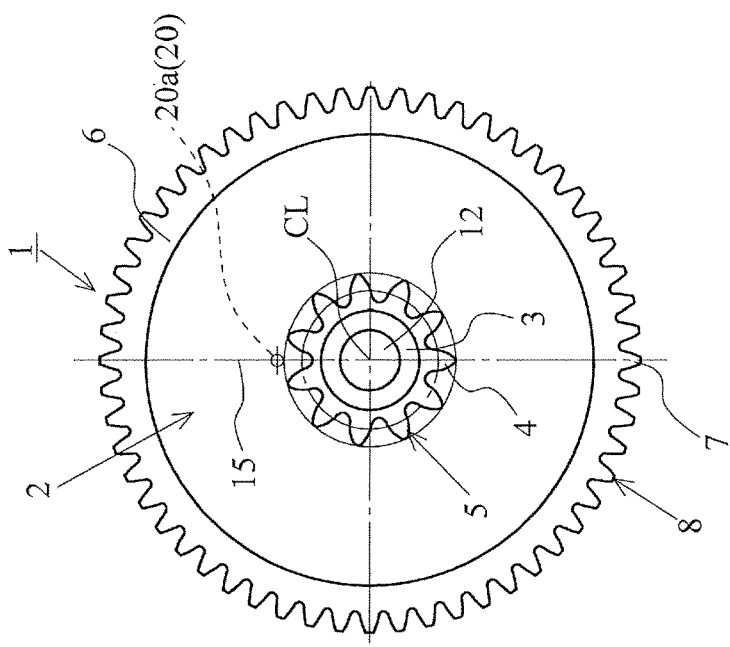
FIGS. 10A-10C include drawings illustrating a resin gear according to a fifth embodiment of the present invention and a modification of the resin gear illustrated in FIG. 3.
Figure 10B:
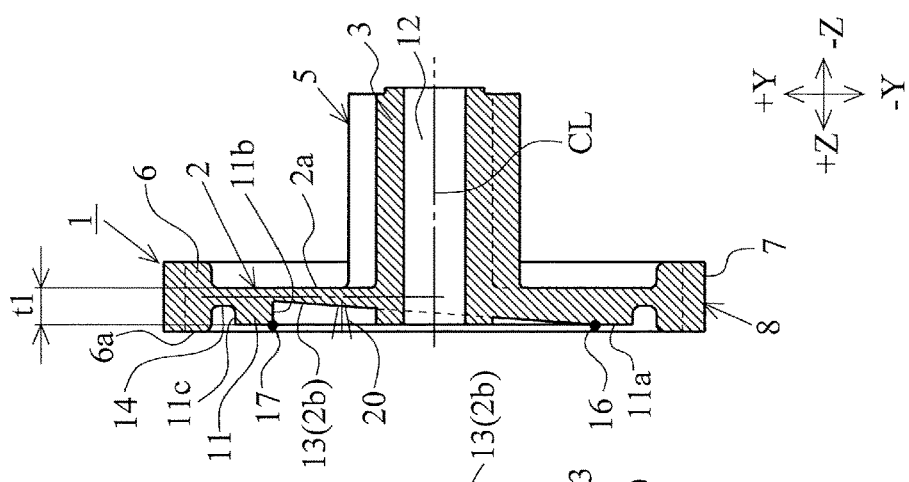
Figure 10A:
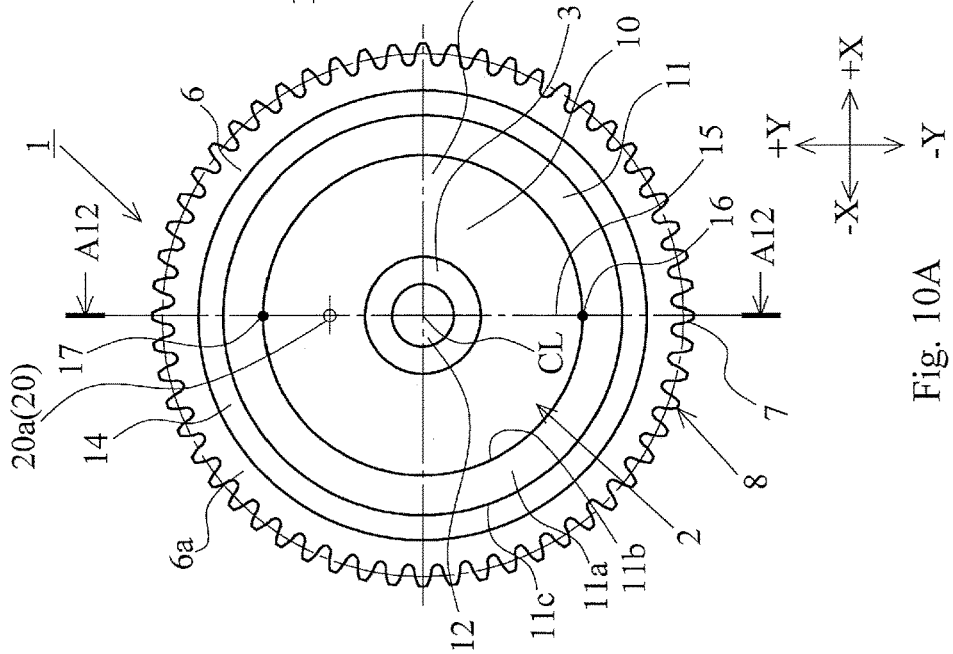

FIG. 10 includes drawings illustrating a resin gear 1 according to a fifth embodiment of the present invention and a modification of the resin gear 1 illustrated in FIG. 3. FIG. 10A is a front view of the resin gear 1, FIG. 10B is a cross-sectional view of the resin gear 1 taken along a line A12-A12 in FIG. 10A, and FIG. 10C is a back view of the resin gear 1.

The resin gear 1 according to the embodiment illustrated in FIG. 10 is configured such that the first annular rib 10 of the resin gear 1 illustrated in FIG. 3 is omitted and the inner web portion 13 couples the boss 3 to the annular rib (the second annular rib in FIG. 3) 11. Then, When a pair of intersection points 16 and 17 of a virtual radial direction line 15, passing through the center (CL) of the boss 3 and extending in the radial direction, with the inner peripheral surface 11b of the second annular rib 11 are distinguished into the one intersection point 16 and the other intersection point 17, the side surface (the one side surface 2b of the web 2) of the inner web portion 13 has only one gate mark 20a of the injection molding at a position on a radially outer side with respect to the first tooth portion 5 and a position biased to the other intersection point 17 on the virtual radial direction line 15. The resin gear 1 according to the embodiment with such configuration can provide the effect similar to that of the resin gear 1 illustrated in FIG. 3 by devising, for example, a ratio of the thickness on the one intersection point 16 side to the thickness on the other intersection point 17 side of the inner web portion 13.

[Sixth Embodiment]

Figure 11A:
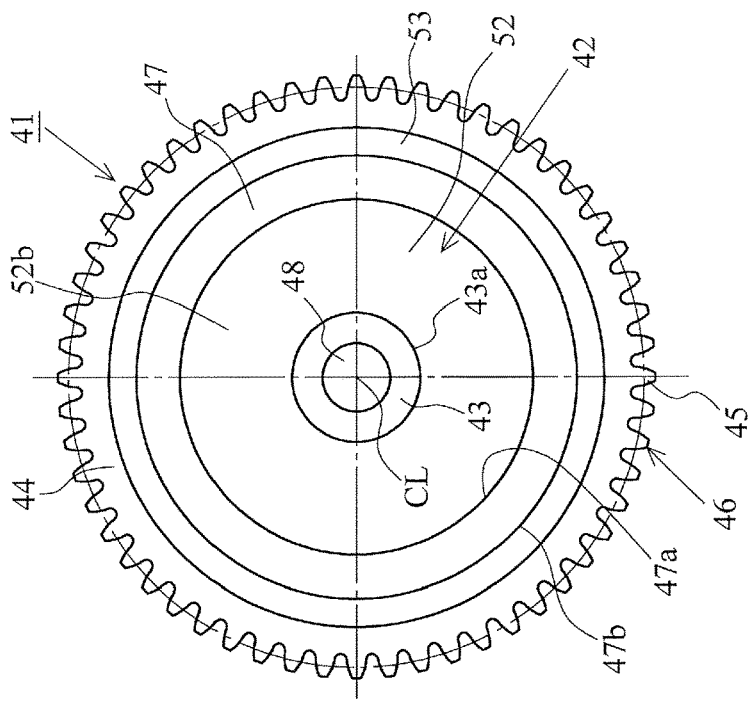
FIGS. 11A-11C include drawings illustrating a resin gear according to a sixth embodiment of the present invention and a modification of the resin gear illustrated in FIG. 6.
Figure 11B:
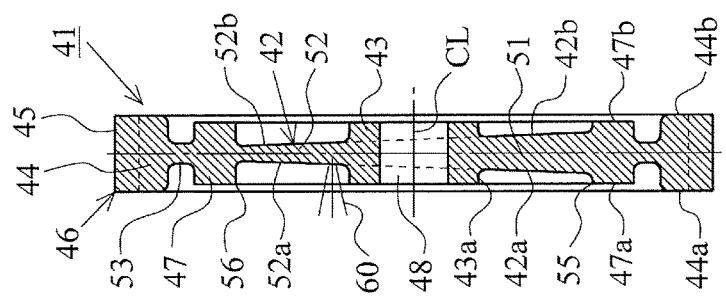
Figure 11C:
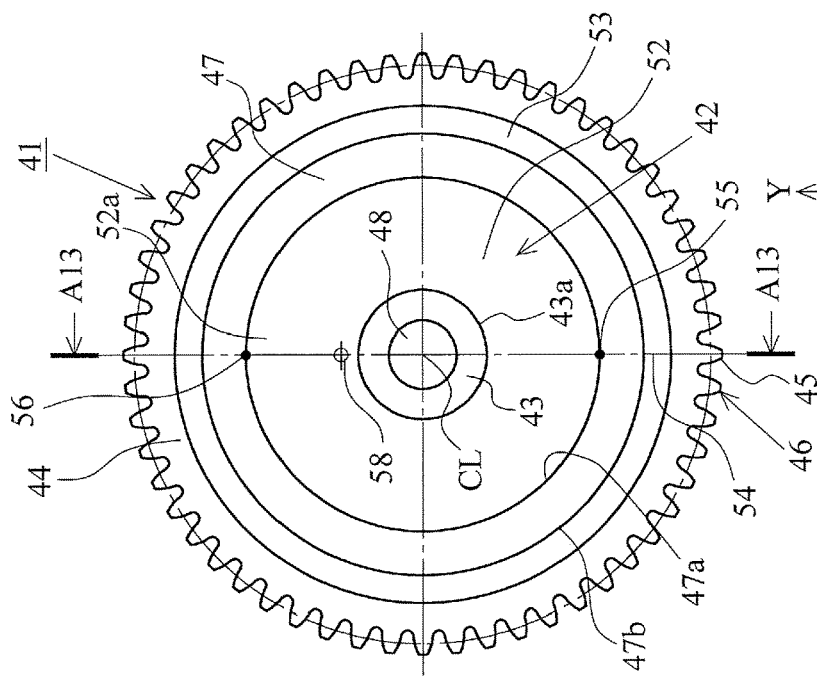
Figures 12A, 12B, 12C:
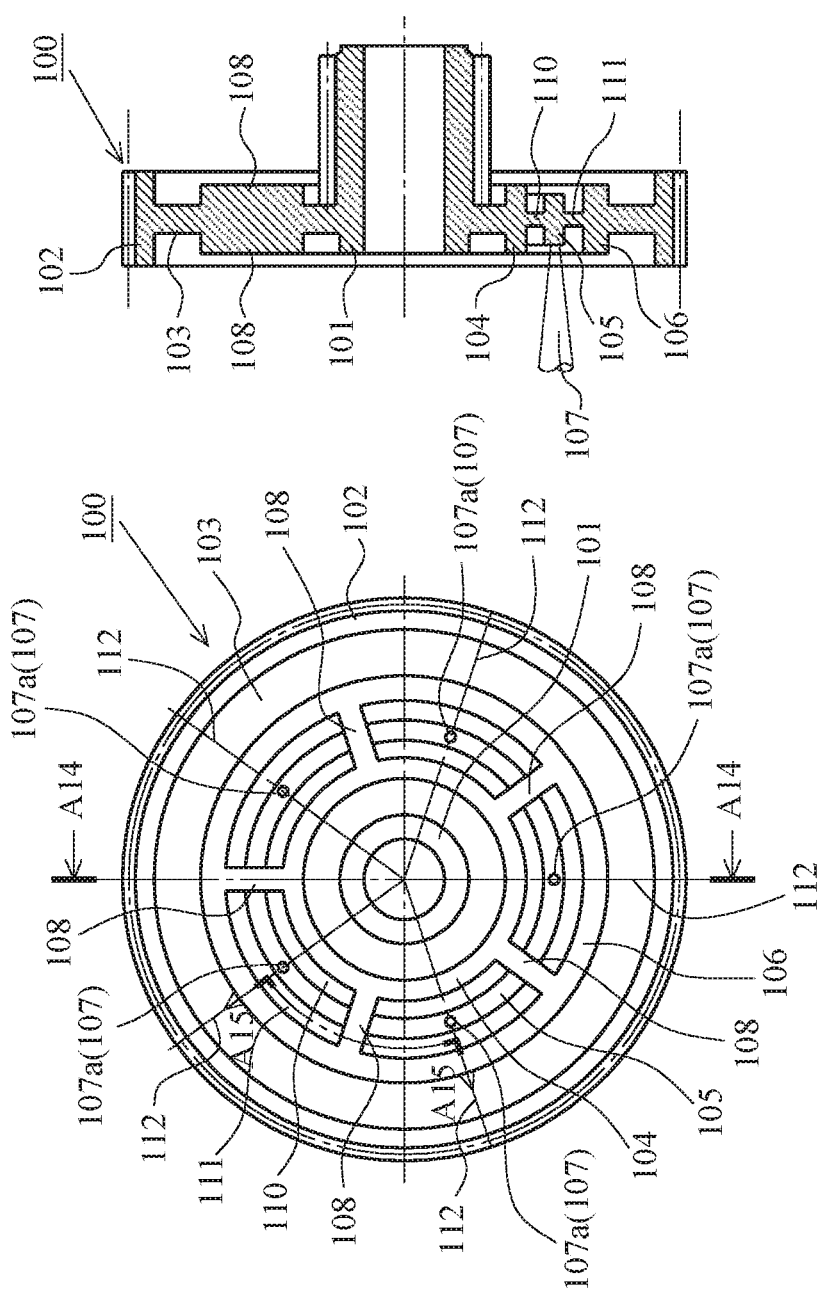
FIGS. 12A-12C include drawings illustrating a conventional resin gear.

FIG. 11 includes drawings illustrating a resin gear 41 according to a sixth embodiment of the present invention and a modification of the resin gear 41 illustrated in FIG. 6. FIG. 11A is a front view of the resin gear 41, FIG. 11B is a cross-sectional view of the resin gear 41 taken along a line A13-A13 in FIG. 11A, and FIG. 11C is a back view of the resin gear 41.

The resin gear 41 according to the embodiment illustrated in FIG. 11 is configured such that the gate-receiving protrusion 50 of the resin gear 41 illustrated in FIG. 6 is omitted and the inner web portion 52 couples the boss 43 to the annular rib 47. Then, only one gate mark 58 of the injection molding is formed at a position biased to the boss 43 on the one side surface 52*a* of the web 42 (the inner web portion 52) and a position biased to the other intersection point 56 on the virtual radial direction line 54. The resin gear 41 according to the embodiment with such configuration can provide the effect similar to that of the resin gear 41 illustrated in FIG. 6 by devising, for example, a ratio of the thickness on the one intersection point 55 side to the thickness on the other intersection point 56 side of the inner web portion 52.

[Other Embodiments]

While the present invention has described the teeth 4 and 7 of the first tooth portion 5 and the second tooth portion 8 of the resin gear 1 according to the first embodiment as the spur teeth, not limiting to this, the teeth 4 and 7 of the first tooth portion 5 and the second tooth portion 8 may be helical teeth. While the present invention has described the tooth 45 of the tooth portion 46 of the resin gear 41 according to the second embodiment as the spur tooth, not limiting to this, the tooth 45 of the tooth portion 46 may be a helical tooth. The resin gear 1 according to the present invention is applicable to a bevel gear and a face gear.

While the resin gear 1 according to the first embodiment has the inner web portion 13 formed to have the thickness gradually reduced in the wedge shape from the one intersection point 16 toward the other intersection point 17 among the pair of the intersection points 16 and 17 of the virtual radial direction line 15, passing through the center (CL) of the boss 3 and extending in the radial direction, with the inner peripheral surface 11*b* of the second annular rib 11 (see FIG. 1 and FIG. 2), the thickness may be gradually reduced in a staircase pattern. While the resin gear 41 according to the second embodiment has the inner web portion 52 formed to have the thickness gradually reduced in the wedge shape from the one intersection point 55 toward the other intersection point 56 among the pair of the intersection points 55 and 56 of the virtual radial direction line 54, passing through the center (CL) of the boss 43 and extending in the radial direction, with the inner peripheral surface 47*a* of the annular rib 47 (see FIG. 5), the thickness may be gradually reduced in a staircase pattern.

The resin gear 1 according to the present invention is not limited to the first embodiment, and may be configured such that the outer web portion 14 is positioned to be displaced off the center in the tooth-width direction of the second tooth portion 8 in the tooth-width direction. The resin gear 41 according to the present invention is not limited to the second embodiment, and may be configured such that the outer web portion 53 is positioned to be displaced off the center in the tooth-width direction of the tooth portion 46 in the tooth-width direction. The resin-tooth-provided belt pulley 80 according to the present invention is not limited to the third embodiment, and may be configured such that the outer web portion 53 is positioned to be displaced off the center in the tooth-width direction of the tooth portion 81 in the tooth-width direction. The resin rotator 82 according to the present invention is not limited to the fourth embodiment, and may be configured such that the outer web portion 53 is positioned to be displaced off the center in the tooth-width direction of the outer peripheral side tubular portion 83 in the width direction.

The present invention is not limited to the above-described respective embodiments, and the thicknesses of the first annular rib 10, the second annular rib 11, and the annular rib 47 may be varied along the circumferential direction.

DESCRIPTION OF REFERENCE SIGNS

1, 41: Resin gear
2, 42: Web
2*a*, 42*a*: One side surface
3, 43: Boss
4, 7, 45: Tooth
5: First tooth portion
6, 44: Rim
8: Second tooth portion
10: First annular rib
10*c*: Side surface
11: Second annular rib
13, 52: Inner web portion
14, 53: Outer web portion
15, 54: Virtual radial direction line
16, 55: One intersection point
17, 56: Other intersection point
20*a*, 58: Gate mark
43*a*: Outer peripheral surface
46: Tooth portion
47: Annular rib
50: Gate-receiving protrusion
80: Resin-tooth-provided belt pulley
81: Tooth portion
81*a*: Tooth
82: Resin rotator
83: Outer peripheral side tubular portion

The invention claimed is:

1. A resin gear comprising:
a circular plate-shaped web;
a cylindrically-shaped boss formed at a radially inward end of the web;
a first tooth portion formed on one side surface side of the web and an outer peripheral surface of the boss, the first tooth portion including a plurality of teeth;
a cylindrically-shaped rim positioned at a radially outward end of the web and concentric with the boss; and
a second tooth portion formed on an outer peripheral surface of the rim, the second tooth portion including a plurality of teeth, wherein
a first annular rib is formed on another side surface of the web and in proximity to the boss, the first annular rib being concentric with the boss,
a second annular rib is formed on the other side surface of the web and between the first annular rib and the rim, the second annular rib being concentric with the rim,
the web has an inner web portion and an outer web portion, the inner web portion coupling the first annular rib to the second annular rib, the outer web portion coupling the second annular rib to the rim,
the inner web portion is formed to have a thickness gradually reduced from one intersection point toward another intersection point among a pair of intersection points of a virtual radial direction line with the second annular rib, the virtual radial direction line passing through a center of the boss and extending in a radial direction,
the inner web portion has a thickness on the other intersection point side thinner than a thickness of a portion on which the second annular rib is formed,
the outer web portion is formed to be thinner than the thickness of the portion on which the second annular rib is formed, and
the first annular rib has a side surface on which only one gate mark of an injection molding is formed at a position on a radially outer side with respect to the first tooth portion and a position biased to the other intersection point on the virtual radial direction line.

2. A resin gear comprising:
a circular plate-shaped web;
a cylindrically-shaped boss formed at a radially inward end of the web;
a cylindrically-shaped rim positioned at a radially outward end of the web and concentric with the boss; and
a tooth portion formed on an outer peripheral surface of the rim, the tooth portion including a plurality of teeth, wherein
an annular rib is formed on both side surfaces of the web and at a position biased to the rim with respect to the boss, the annular rib being concentric with the rim,
the web has an inner web portion and an outer web portion, the inner web portion coupling the boss to the annular rib, the outer web portion coupling the annular rib to the rim,
the inner web portion is formed to have a thickness gradually reduced from one intersection point toward another intersection point among a pair of intersection points of a virtual radial direction line with the annular rib, the virtual radial direction line passing through a center of the boss and extending in a radial direction,
the inner web portion is formed to have a thickness on the other intersection point side thinner than a thickness of a portion on which the annular rib is formed,
the outer web portion is formed to be thinner than the thickness of the portion on which the annular rib is formed,
respective annular gate-receiving protrusions concentric with the boss are formed at corner portions of both side surfaces of the web and an outer peripheral surface of the boss, the gate-receiving protrusions being formed across the web and the boss, and
one of the gate-receiving protrusions on both side surfaces of the web has only one gate mark of an injection molding at a position biased to the other intersection point on the virtual radial direction line.

3. A resin gear comprising:
a circular plate-shaped web;
a cylindrically-shaped boss formed at a radially inward end of the web;
a first tooth portion formed on one side surface side of the web and an outer peripheral surface of the boss, the first tooth portion including a plurality of teeth;
a cylindrically-shaped rim positioned at a radially outward end of the web and concentric with the boss; and
a second tooth portion formed on an outer peripheral surface of the rim, the second tooth portion including a plurality of teeth, wherein
an annular rib is formed on another side surface of the web and between the boss and the rim, the annular rib being concentric with the rim,
the web has an inner web portion and an outer web portion, the inner web portion being positioned inside the annular rib, the outer web portion coupling the annular rib to the rim,
the inner web portion is formed to have a thickness gradually reduced from one intersection point toward another intersection point among a pair of intersection points of a virtual radial direction line with the annular rib, the virtual radial direction line passing through a center of the boss and extending in a radial direction,
the inner web portion has a thickness on the other intersection point side thinner than a thickness of a portion on which the annular rib is formed,
the outer web portion is formed to be thinner than the thickness of the portion on which the annular rib is formed, and
the inner web portion has the other side surface on which only one gate mark of an injection molding is formed at a position on a radially outer side with respect to the first tooth portion and a position biased to the other intersection point on the virtual radial direction line.

4. A resin gear comprising:
a circular plate-shaped web;
a cylindrically-shaped boss formed at a radially inward end of the web;
a cylindrically-shaped rim positioned at a radially outward end of the web and concentric with the boss; and
a tooth portion formed on an outer peripheral surface of the rim, the tooth portion including a plurality of teeth, wherein
an annular rib is formed on both side surfaces of the web and at a position biased to the rim with respect to the boss, the annular rib being concentric with the rim,
the web has an inner web portion and an outer web portion, the inner web portion coupling the boss to the annular rib, the outer web portion coupling the annular rib to the rim,
the inner web portion is formed to have a thickness gradually reduced from one intersection point toward another intersection point among a pair of intersection points of a virtual radial direction line with the annular rib, the virtual radial direction line passing through a center of the boss and extending in a radial direction,
the inner web portion is formed to have a thickness on the other intersection point side thinner than a thickness of a portion on which the annular rib is formed,
the outer web portion is formed to be thinner than the thickness of the portion on which the annular rib is formed, and
only one gate mark of an injection molding is formed at a position biased to the boss on the one side surface of the web and a position biased to the other intersection point on the virtual radial direction line.

5. The resin gear according to claim 1, wherein
a tooth-tip center of one tooth of the first tooth portion and a tooth-tip center of one tooth of the second tooth portion are positioned on the virtual radial direction line extending from the center of the boss to the one intersection point side.

6. The resin gear according to claim 1, wherein
the inner web portion includes at least one pair of radial direction ribs on the other intersection point side having the virtual radial direction line as a symmetry axis, the radial direction ribs coupling the first annular rib to the second annular rib in a radial direction, and
the radial direction rib has a thickness equal to or less than a thickness of a portion where a thickness of the inner web portion is thinnest.

7. The resin gear according to claim 2, wherein
a tooth-tip center of one tooth of the tooth portion is positioned on the virtual radial direction line extending from the center of the boss to the one intersection point side.

8. The resin gear according to claim 2, wherein
the inner web portion includes at least one pair of radial direction ribs on the other intersection point side having the virtual radial direction line as a symmetry axis, the radial direction ribs coupling the gate-receiving protrusion to the annular rib in a radial direction, and the radial direction rib has a thickness equal to or less than a thickness of a portion where a thickness of the inner web portion is thinnest.

9. The resin gear according to claim 2, wherein
the resin gear has a linearly symmetrical shape having a center line as a symmetry axis, the center line passing through a center of the tooth portion in a tooth-width direction and being parallel to the virtual radial direction line.

10. The resin gear according to claim 1, wherein
the outer web portion is coupled to the rim such that a center position in a thickness direction matches a center position of the rim in a tooth-width direction.

11. An injection molding method for a resin gear formed by injecting a molten resin into a cavity of a mold, wherein
A. the resin gear includes: a circular plate-shaped web; a cylindrically-shaped boss formed at a radially inward end of the web; a first tooth portion formed on one side surface side of the web and an outer peripheral surface of the boss, the first tooth portion including a plurality of teeth; a cylindrically-shaped rim positioned at a radially outward end of the web and concentric with the boss; and a second tooth portion formed on an outer peripheral surface of the rim, the second tooth portion including a plurality of teeth,
a first annular rib is formed on another side surface of the web and in proximity to the boss, the first annular rib being concentric with the boss,
a second annular rib is formed on the other side surface of the web and between the first annular rib and the rim, the second annular rib being concentric with the rim,
the web has an inner web portion and an outer web portion, the inner web portion coupling the first annular rib to the second annular rib, the outer web portion coupling the second annular rib to the rim,
the inner web portion is formed to have a thickness gradually reduced from one intersection point toward another intersection point among a pair of intersection points of a virtual radial direction line with the second annular rib, the virtual radial direction line passing through a center of the boss and extending in a radial direction,
the inner web portion has a thickness on the other intersection point side thinner than a thickness of a portion on which the second annular rib is formed,
the outer web portion is formed to be thinner than the thickness of the portion on which the second annular rib is formed,
B. the mold is formed at only one position such that a gate for injecting the molten resin into the cavity opens at a position on a radially outer side with respect to the first tooth portion and a portion biased to the other intersection point on the virtual radial direction line in a cavity portion forming the first annular rib, and
C. the molten resin injected from the gate into the cavity portion forming the first annular rib flows in a cavity portion forming the boss, a cavity portion forming the first tooth portion, and a cavity portion forming the inner web portion, subsequently, flows into a cavity portion forming the second annular rib and is accumulated, flows out from the cavity portion forming the second annular rib to a cavity portion forming the outer web portion so as to uniformize a radially outward flow velocity by flowing in the cavity portion forming the outer web portion, flows in a cavity portion forming the rim approximately concentrically and diffusing radially outward, and subsequently, is approximately simultaneously filled into a cavity portion forming the second tooth portion.

12. An injection molding method for a resin gear formed by injecting a molten resin into a cavity of a mold, wherein
A. the resin gear includes: a circular plate-shaped web; a cylindrically-shaped boss formed at a radially inward end of the web; a cylindrically-shaped rim positioned at a radially outward end of the web and concentric with the boss; and a tooth portion formed on an outer peripheral surface of the rim, the tooth portion including a plurality of teeth,
an annular rib is formed on both side surfaces of the web and at a position biased to the rim with respect to the boss, the annular rib being concentric with the rim,
the web has an inner web portion and an outer web portion, the inner web portion coupling the boss to the annular rib, the outer web portion coupling the annular rib to the rim,
the inner web portion is formed to have a thickness gradually reduced from one intersection point toward another intersection point among a pair of intersection points of a virtual radial direction line with the annular rib, the virtual radial direction line passing through a center of the boss and extending in a radial direction,
the inner web portion has a thickness on the other intersection point side thinner than a thickness of a portion on which the annular rib is formed,
the outer web portion is formed to be thinner than the thickness of the portion on which the annular rib is formed,
annular gate-receiving protrusions concentric with the boss are formed at corner portions of both side surfaces of the web and an outer peripheral surface of the boss, the gate-receiving protrusions being formed across the web and the boss,
B. the mold is formed at only one position such that a gate for injecting the molten resin into the cavity opens at a cavity portion forming the gate-receiving protrusion and a position biased to the other intersection point on the virtual radial direction line, and
C. the molten resin injected from the gate into the cavity portion forming the gate-receiving protrusion flows in a cavity portion forming the boss and a cavity portion forming the inner web portion, subsequently, flows into a cavity portion forming the annular rib and is accumulated, flows out from the cavity portion forming the annular rib to a cavity portion forming the outer web portion so as to uniformize a radially outward flow velocity by flowing in the cavity portion forming the outer web portion, flows in a cavity portion forming the rim approximately concentrically and diffusing radially outward, and subsequently, is approximately simultaneously filled into a cavity portion forming the tooth portion.

13. A resin-tooth-provided belt pulley comprising:
a circular plate-shaped web;
a cylindrically-shaped boss formed at a radially inward end of the web;
a cylindrically-shaped rim positioned at a radially outward end of the web and concentric with the boss; and
a tooth portion formed on an outer peripheral surface of the rim, the tooth portion including a plurality of teeth, wherein
an annular rib is formed on one side surface of the web and at a position biased to the rim with respect to the boss, the annular rib being concentric with the rim, the web has an inner web portion and an outer web portion, the inner web portion coupling the boss to the annular rib, the outer web portion coupling the annular rib to the rim, the inner web portion is formed to have a thickness gradually reduced from one intersection point toward another intersection point among a pair of intersection points of a virtual radial direction line with the annular rib, the virtual radial direction line passing through a center of the boss and extending in a radial direction, the inner web portion is formed to have a thickness on the other intersection point side thinner than a thickness of a portion on which the annular rib is formed, the outer web portion is formed to be thinner than the thickness of the portion on which the annular rib is formed, respective annular gate-receiving protrusions concentric with the boss are formed at corner portions of both side surfaces of the web and an outer peripheral surface of the boss, the gate-receiving protrusions being formed across the web and the boss, and one of the gate-receiving protrusions on both side surfaces of the web has only one gate mark of an injection molding at a position biased to the other intersection point on the virtual radial direction line.

14. A resin rotator comprising:

a circular plate-shaped web;

a cylindrically-shaped boss formed at a radially inward end of the web; and a cylindrically-shaped outer peripheral side tubular portion positioned at a radially outward end of the web and concentric with the boss, wherein an annular rib is formed on one side surface of the web and at a position biased to the outer peripheral side tubular portion with respect to the boss, the annular rib being concentric with the outer peripheral side tubular portion, the web has an inner web portion and an outer web portion, the inner web portion coupling the boss to the annular rib, the outer web portion coupling the annular rib to the outer peripheral side tubular portion, the inner web portion is formed to have a thickness gradually reduced from one intersection point toward another intersection point among a pair of intersection points of a virtual radial direction line with the annular rib, the virtual radial direction line passing through a center of the boss and extending in a radial direction, the inner web portion is formed to have a thickness on the other intersection point side thinner than a thickness of a portion on which the annular rib is formed, the outer web portion is formed to be thinner than the thickness of the portion on which the annular rib is formed, respective annular gate-receiving protrusions concentric with the boss are formed at corner portions of both side surfaces of the web and an outer peripheral surface of the boss, the gate-receiving protrusions being formed across the web and the boss, and one of the gate-receiving protrusions on both side surfaces of the web has only one gate mark of an injection molding at a position biased to the other intersection point on the virtual radial direction line.

15. The resin gear according to claim 2, wherein the outer web portion is coupled to the rim such that a center position in a thickness direction matches a center position of the rim in a tooth-width direction.

\* \* \* \* \*